(12) United States Patent
Moriguchi

(10) Patent No.: US 9,441,968 B2
(45) Date of Patent: Sep. 13, 2016

(54) DIRECTION DETECTOR

(71) Applicant: SUMITOMO PRECISION PRODUCTS CO., LTD., Amagasaki-shi, Hyogo (JP)

(72) Inventor: Takafumi Moriguchi, Amagasaki (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 0 days.

(21) Appl. No.: 14/776,738

(22) PCT Filed: Jan. 30, 2014

(86) PCT No.: PCT/JP2014/052133
§ 371 (c)(1),
(2) Date: Sep. 14, 2015

(87) PCT Pub. No.: WO2014/156288
PCT Pub. Date: Oct. 2, 2014

(65) Prior Publication Data
US 2016/0033271 A1 Feb. 4, 2016

(30) Foreign Application Priority Data

Mar. 29, 2013 (JP) ................................. 2013-071378

(51) Int. Cl.
*G01C 19/00* (2013.01)
*G01C 19/56* (2012.01)
*G01C 21/16* (2006.01)
*G01C 19/38* (2006.01)

(52) U.S. Cl.
CPC ............... *G01C 19/00* (2013.01); *G01C 19/38* (2013.01)

(58) Field of Classification Search
USPC ................................ 73/504.02; 33/316, 320
See application file for complete search history.

(56) References Cited

U.S. PATENT DOCUMENTS 9,015,952 B2 * 4/2015 Magosaki ............. G01C 19/38
33/316

FOREIGN PATENT DOCUMENTS

| EP | 2604973 A1 | 6/2013 |
| JP | H04-142088 A | 5/1992 |
| JP | H08-210855 A | 8/1996 |
| JP | 2012-112679 A | 6/2012 |

* cited by examiner

*Primary Examiner* — Lisa Caputo
*Assistant Examiner* — Jamel Williams
(74) *Attorney, Agent, or Firm* — Rabin & Berdo, P.C.

(57) ABSTRACT

A direction detector that allows true north detection accuracy to be improved is provided. In a direction detector 1, an attitude changer 100 rotates an angular velocity sensor 26 around a detection axis and controls an attitude of the angular velocity sensor 26 so that the detection axis is directed in a predetermined measuring direction and an opposite direction to the predetermined measuring direction. A control device 30 controls the attitude changer 100 so that the angular velocity sensor 26 rotates in a first rotation direction around the detection axis before the angular velocity sensor 26 starts to detect an angular velocity around the predetermined measuring direction. The control device 30 controls the attitude changer 100 so that the angular velocity sensor 26 rotates in a second rotation direction opposite to the first rotation direction around the detection axis and, thereafter, the angular velocity sensor 26 rotates in the first rotation direction around the detection axis before the angular velocity sensor 26 starts to detect an angular velocity around the opposite direction.

6 Claims, 22 Drawing Sheets

| DIRECTED DIRECTION | +U | −W | +V | −U | +W | −V | +U |
|---|---|---|---|---|---|---|---|
| ROTATION POSITION OF SHAFT 20(deg) | 0 | 240 | 480 | 720 | 960 | 1200 | 1440 |
| ROTATION AMOUNT AROUND X-AXIS (+y AXIS) | 0 | 60 | 120 | 180 | 240 | 300 | 360 |

Fig.20

ROTATION POSITION CONTROL TABLE

| AXIAL DIRECTION | +U | −U | +U | +V | −V | +V | +W | −W | +W | +U |
|---|---|---|---|---|---|---|---|---|---|---|
| ROTATION POSITION (SHAFT 20) | 0 | 720 | 0 | 480 | 1200 | 480 | 960 | 240 | 960 | 0 |
| ROTATION AMOUNT (SHAFT 20) | / | +720 | −720 | +480 | +720 | −720 | +480 | −720 | +720 | −960 |
| CONTROL FLAG | / | 0 | 0 | 1 | 0 | 0 | 0 | 0 | 0 | 0 |

| AXIAL DIRECTION | +U | −U | +U | +V | −V | +V | +W | −W | +W | +U |
|---|---|---|---|---|---|---|---|---|---|---|
| A (SIGN OF AXIAL DIRECTION) | / | − | + | + | − | + | + | − | + | + |
| B (ROTATION DIRECTION OF SHAFT 20) | / | + | − | + | + | − | + | − | + | − |
| A × B | / | − | − | + | − | − | + | + | + | − |

◇ NORMAL ROTATION CONTROL ONLY (FIRST TIME)
☐ NORMAL ROTATION CONTROL ONLY (SECOND TIME)
▲ EXCESS ROTATION CONTROL AS WELL (FIRST TIME)
○ EXCESS ROTATION CONTROL AS WELL (SECOND TIME)

DIRECTION DETECTOR

TECHNICAL FIELD

The present invention relates to direction detectors and more particularly to a direction detector that detects true north using an angular velocity sensor.

BACKGROUND ART

Magnetic north is slightly shifted from true north, and therefore true north cannot be detected by a magnetic compass. However, administrative maps are produced based on true north, and the Construction Standards Act is also based on true north. Therefore, in the field of civil engineering and construction, true north must be measured correctly. In underground tunnel construction, in particular, a magnetic compass does not function correctly because of the effect of a mineral vein or the like.

A conventional gyro compass that detects the earth's rotational angular velocity to determine true north has been known as a true north detector that detects true north correctly. Gyro compasses are generally orthogonal three-axis type devices. The gyro compasses are large in size and highly costly.

Single-axis or two-axis type gyro compasses have been proposed in order to reduce the size and the cost. Most of such gyro compasses however have a gyro sensor and an acceleration sensor rotated on a rotation base. However, a large space must be secured for its large rotation angle, and this limits how compact the device can be. Most single-axis type gyro compasses need a horizontal plane, which makes it cumbersome to handle them. Single-axis type gyro compasses that do not need a horizontal plane have been suggested. Their direction measuring accuracies are inferior to those of three-axis type compasses.

Therefore, the applicant has suggested a six-direction indicator that is a single-axis type device and does not need a horizontal plane in the disclosure of JP 2012-112679 A. The six-direction indicator takes account of a UVW rectangular coordinate system in addition to an XYZ rectangular coordinate system. The six directions, +U, −U, +V, −V, +W, and −W are provided apart at intervals of 60 deg when they are projected orthogonally on an YZ plane.

The six-direction indicator includes a shaft, a driving source, a rotation member, and a guide member. The shaft extends in the X-direction. The driving source rotates the shaft around the X axis. The rotation member is rotatable around an axis inclined at $\alpha$ deg with respect to the shaft and coupled with the shaft. The rotation member includes a spherical surface and an orbit portion formed around the x-axis of the spherical surface. The guide member is fixed to an XYZ rectangular coordinate system and in contact with the orbit portion. The six-direction indicator takes account of an xyz coordinate system fixed to the rotation member. The xyz coordinate system rotates within the XYZ coordinate system according to the rotation of the rotation member. The orbit portion has such a shape that the y-axis of the rotation member is directed in each of the +U, −U, +V, −V, +W, and −W directions when the rotation member rotates in contact with the guide member by the rotation of the shaft.

An angular velocity sensor and an acceleration sensor are provided in the rotation member. The angular velocity sensor detects an angular velocity around the y-direction. The acceleration sensor detects a gravitational acceleration around the y-direction. The six-direction indicator measures a rotational angular velocity and a gravitational acceleration around the U, V, and W axes by directing the y-axis of the rotation member sequentially in the directions of the +U, −U, +V, −V, +W, and −W. An azimuth angle $\psi$ is calculated based on the measured rotational angular velocity and gravitational acceleration.

It has been known that the angular velocity sensor outputs an angular velocity that is not zero (offset) even though there is no rotation generated around the detection axis. The offset causes a measurement error in the rotational angular velocities around the U, V, and W axes. Therefore, the six-direction indicator for example calculates the difference between a rotational angular velocity measured when the y-axis is directed in the +V direction and a rotational angular velocity measured when the y-axis is directed in the −V direction. In this way, the offsets included in the rotational angular velocities for the +V axis and −V axis are canceled.

DISCLOSURE OF THE INVENTION

In the above-described six-direction indicator, an error associated with the time constant of the angular velocity sensor is generated and the error associated with the time constant cannot be removed. This will be described specifically in the following.

When the rotation member rotates in contact with the guide member as the shaft rotates, the rotation member rotates not only around the inclined axis but also around the y-axis. More specifically, while the y-axis of the rotation member is moved in each of the +U, −U, +V, −V, +W, and −W directions, the angular velocity sensor moves as it rotates around the y-axis. The angular velocity sensor keeps detecting an angular velocity in association with the rotation of the y-axis while the y-axis moves. The angular velocity sensor outputs an angular velocity on the order of several degrees/second (several tens of thousand degrees/hour) while the y-axis moves.

When the y-axis stops as it is directed in each of the +U, −U, +V, −V, +W, and −W directions, the six-direction indicator measures a rotational angular velocity around each direction. The measured rotational angular velocity is about 15 degrees/hour. On the other hand, the output of the angular velocity sensor when the y-axis moves is on the order of several tens of thousand degrees/hour. The output level of the angular velocity sensor therefore abruptly changes before and after the y-axis is directed in a direction such as the +U axis and stops. Therefore, the output of the angular velocity sensor is affected by the time constant based on the angular velocity output on the order of several tens of thousand degrees/hour during the movement and continuously increases (or decreases) until the measurement ends after the y-axis stops. Therefore, the measured rotational angular velocity includes an error associated with the time constant.

The rotation direction of the rotation member around the y-axis immediately before the y-axis is stopped changes according to the rotation position of the shaft. The rotation direction around the y-axis immediately before the y-axis is stopped may be reversed in some cases between when the y-axis is directed in the +V direction and when the y-axis is directed in the −V direction. As a result, the characteristic of an error associated with the time constant when the y-axis is directed in the +V direction and the characteristic of an error associated with the time constant when the y-axis is directed in the −V direction are reversed. As described above, in order to cancel an offset, the difference between a rotational angular velocity in the +V direction and a rotational angular velocity in the −V direction is calculated, but the error associated with the time constant is not canceled but added during the calculation. Since rotational angular velocities around the V axis include errors associated with the time constant, the six-direction indicator cannot determine true north correctly.

An object of the present invention is to provide a direction detector that allows detection accuracy for true north to be improved.

A direction detector according to the present invention includes an angular velocity sensor, an attitude changer, and a control device. The attitude changer rotates the angular velocity sensor around a detection axis and changes an attitude of the angular velocity sensor so that the detection axis is directed in a predetermined measuring direction and an opposite direction to the predetermined measuring direction. The control device controls the attitude changer. The control device includes a first controller and a second controller. The first controller controls the attitude changer so that the angular velocity sensor rotates in a first rotation direction around the detection axis before the angular velocity sensor starts to detect an angular velocity around the predetermined measuring direction. The second controller controls the attitude changer so that the angular velocity sensor rotates in a second rotation direction opposite to the first rotation direction around the detection axis, and, thereafter, the angular velocity sensor rotates in the first rotation direction around the detection axis before the angular velocity sensor starts to detect an angular velocity around the opposite direction.

According to the invention, characteristics of errors associated with a time constant included in angular velocities around the predetermined measuring direction and the opposite direction can be matched. Therefore, the detection accuracy for true north can be improved.

The control device preferably obtains a rotational angular velocity around an axis along the predetermined measuring direction by calculating a difference between an angular velocity around the predetermined measuring direction detected by the angular velocity sensor and an angular velocity around the opposite direction detected by the angular velocity sensor.

In this way, the errors associated with the time constant are canceled in the rotational angular velocity around the axis along the predetermined measuring direction, so that the detection accuracy for true north can be improved.

The attitude changer is preferably provided in an XYZ rectangular coordinate system. The attitude changer includes a shaft, a rotation member, a driving source, and a guide member. The shaft extends in an X-axis direction. The rotation member is provided rotatably around an axis inclined at α deg with respect to the shaft and coupled to the shaft. The rotation member has an xyz rectangular moving coordinate system. The rotation member includes a spherical surface and an orbit portion formed around an x-axis of the spherical surface. The driving source is controlled by the control device to rotate the shaft around the X axis. The guide member is fixed to the XYZ rectangular coordinate system and in contact with the orbit portion. The orbit portion has such a shape that a y axis of the rotation member is sequentially directed in positive and negative directions along a U axis, a V axis, and a W axis crossing one another at intervals of 60 deg around the X axis when the orbit portion rotates in contact with the guide member by the rotation of the shaft. The orbit portion has a zigzag shape that includes four mountain-like portions raised in a positive direction of the x axis and four valley-like portions raised in the negative direction. The angular velocity sensor is attached to the rotation member so that the detection axis is directed along the y axis. The predetermined measuring direction and the opposite direction each match one of the U axis, the V axis, and the W axis.

In this way, in the single-axis type direction detector, the detection accuracy for true north can be improved.

When the angular velocity sensor detects an angular velocity around an axial direction of one of the U axis, the V axis, and the W axis, the control device preferably controls the attitude changer so that the detection axis is directed in the positive direction, the negative direction, and the positive direction of one of the axes in the mentioned order. When the angular velocity sensor detects an angular velocity around one of the axial directions, control by the second controller is carried out a smaller number of times than control by the first controller.

In this way, the attitude changer can be controlled by the second controller less frequently, so that the time required to detect true north can be reduced.

Preferably, when the detection axis is directed in the positive direction of one of the U axis, the V axis, and the W axis, the detection axis has a plus sign, while when the detection axis is directed in the negative direction of one of the U axis, the V axis, and the W axis, the detection axis has a minus sign. When the shaft rotates clockwise as viewed from a front of the direction detector, the rotation direction of the shaft has a plus sign. When the shaft rotates counterclockwise, the rotation direction of the shaft has a minus sign. When the detection axis is directed in the positive direction and the negative direction of one of the axes, whether or not to control the attitude changer by the first controller is determined based on a product of the sign of the detection axis and the sign of the rotation direction.

In this way, the attitude changer can readily determine a criterion on which the attitude changer is controlled by the second controller.

A control program product according to the present invention is used in a direction detector according to the present invention.

BRIEF DESCRIPTION OF THE DRAWINGS

FIG. 20 shows an example of a rotation position control table in FIG. 19.

MODE FOR CARRYING OUT THE INVENTION

Figure 1:
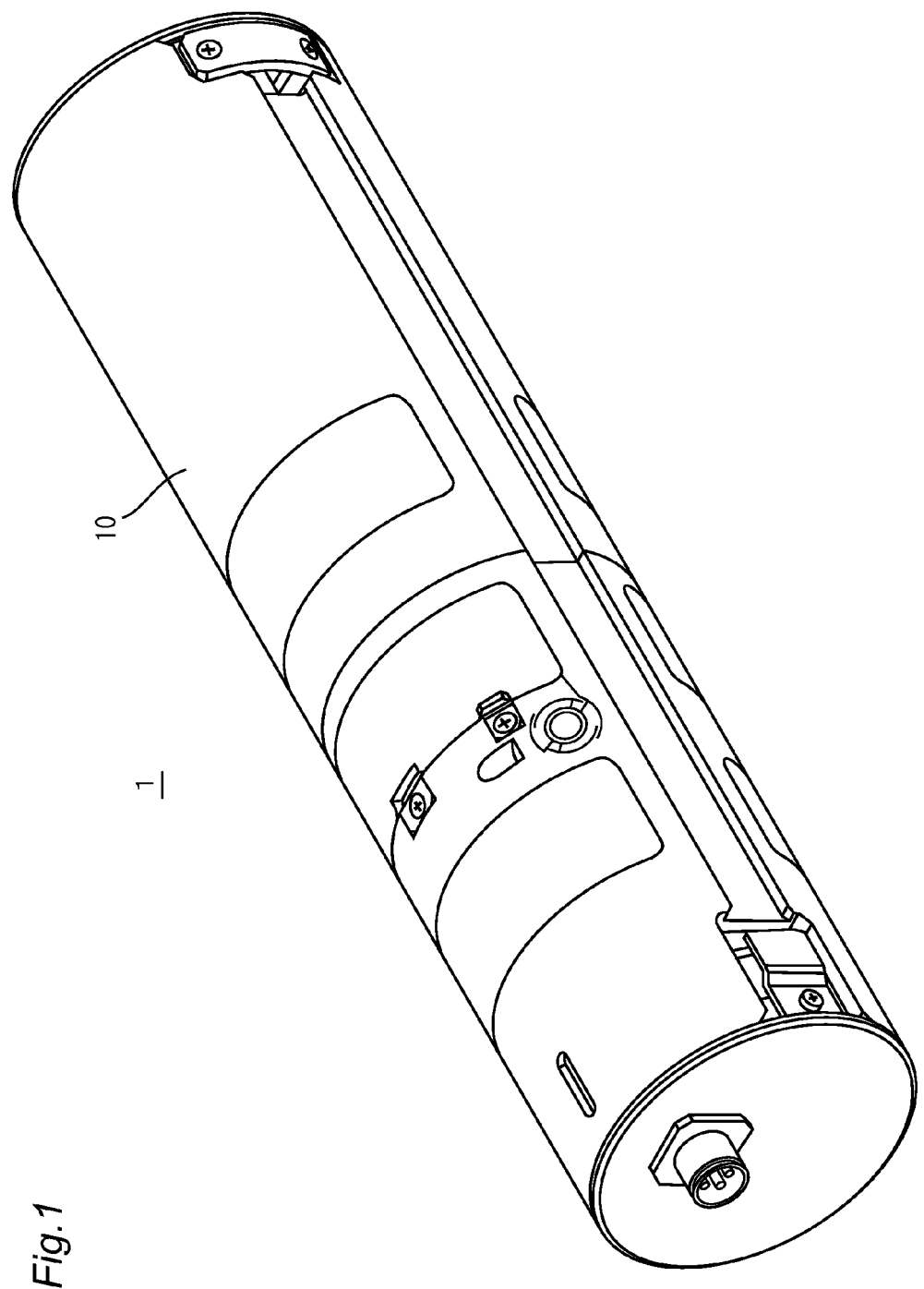
FIG. 1 is a general overview of a direction detector according to an embodiment of the present invention.

Now, an embodiment of the present invention will be described in detail in conjunction with the accompanying drawings. In the drawings, the same or corresponding portions are designated by the same reference characters and their description will not be repeated.

Structure of Direction Detector

FIG. 1 is a general overview of a direction detector 1 according to the embodiment. The direction detector 1 includes a tubular case 10.

Figure 2:
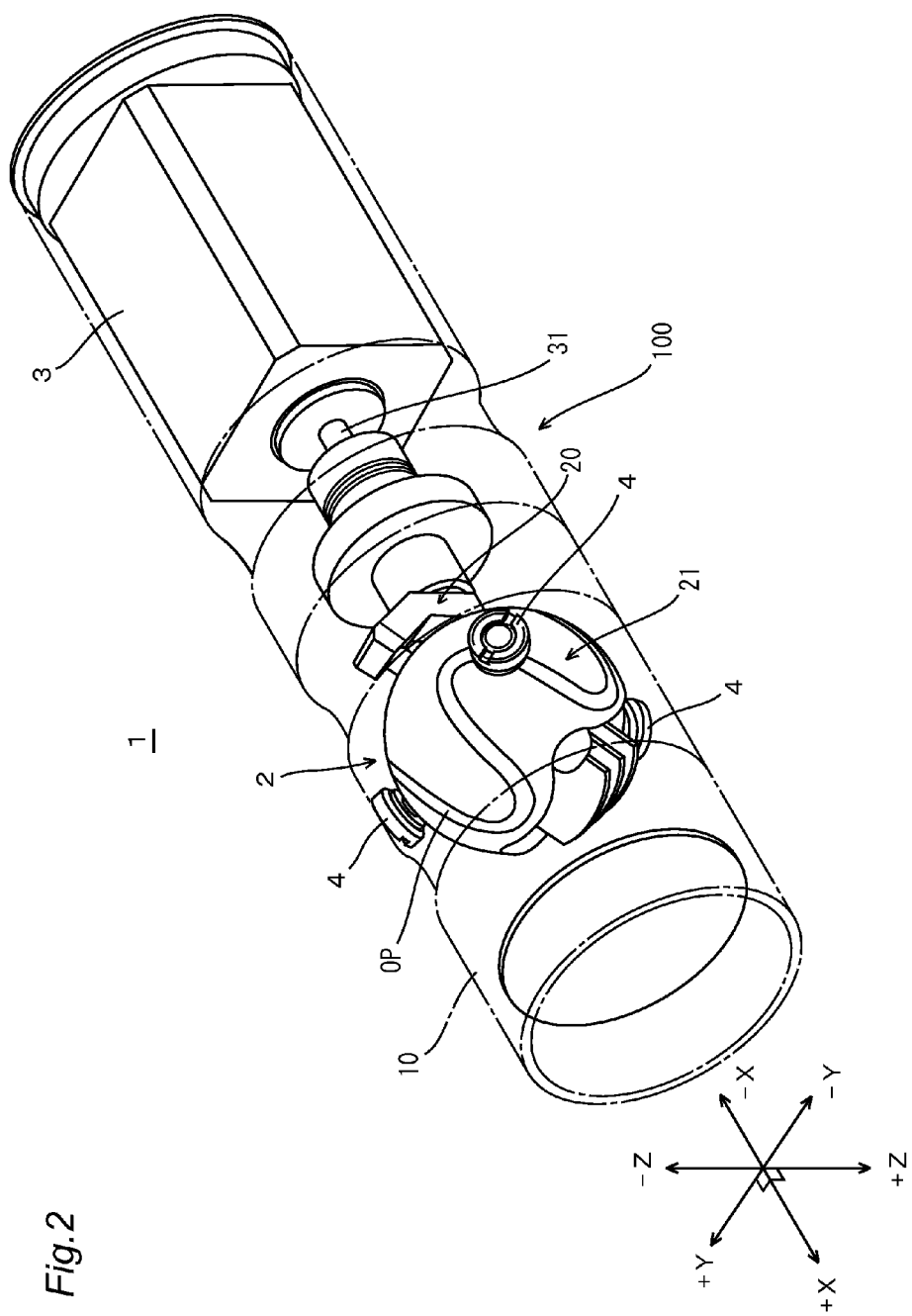
FIG. 2 is a perspective view of the inside structure of the direction detector in FIG. 1.

FIG. 2 is a perspective view showing the inside structure of the case 10 in FIG. 1. In FIG. 2, the case 10 is partly indicated by a chain dotted line. Referring to FIG. 2, the direction detector 1 further includes an attitude changer 100. The attitude changer 100 is stored in the case 10 and includes a driving source 3, an inclined crank mechanism 2, and a plurality of guide members 4. The driving source 3 and the plurality of guide members 4 are secured to the case 10.

The driving source 3 is disposed at a rear part of the case 10. The driving source 3 has a drive shaft 31 and rotates the drive shaft 31 around the center axis of the drive shaft 31. The driving source 3 is for example a motor. The kind of the motor is not particularly specified. The motor may be for example a stepping motor or an ultrasonic motor.

As shown in FIG. 2, the direction detector 1 is provided within an XYZ rectangular coordinate system. More specifically, the case 10 is fixed to the XYZ rectangular coordinate system. The XYZ rectangular coordinate system is a rectangular coordinate system in which X, Y, and Z axes form an angle of 90 deg among one another. The case 10 allocates the X axis on the drive shaft 31 of the driving source 3. According to the embodiment, the +X direction is defined as a front side of the case 10 and the −X direction as a rear side of the case 10. Also according to the embodiment, the +Z axis is allocated to the vertical direction of the case 10. The Y axis is allocated to the horizontal direction of the case 10. According to the embodiment, the +Z direction is defined as a lower side of the case 10 and the −Z direction as an upper side of the case 10. The +Y direction is defined as the left side as viewed from the front of the case 10 and the −Y direction as the right side as viewed from the front of the case 10. The driving source 3 and the guide members 4 are secured to the case 10. Therefore, the driving source 3 and the guide members 4 are fixed to the XYZ rectangular coordinate system.

The inclined crank mechanism 2 is provided in the center of the case 10. The inclined crank mechanism 2 is disposed in front of the driving source 3.

Structure of Inclined Crank Mechanism 2

Figure 3:
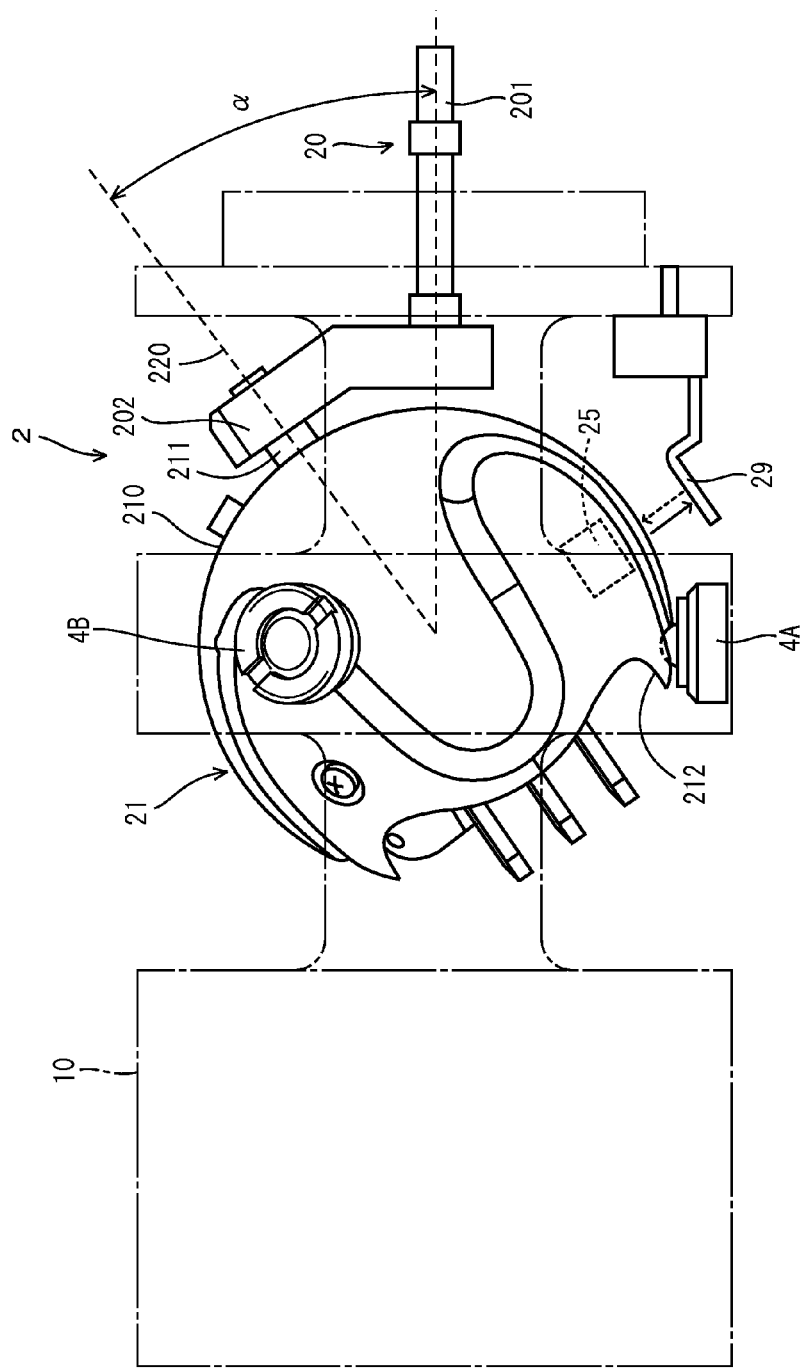
FIG. 3 is a side view of an inclined crank mechanism and its vicinity in the direction detector in FIG. 2.

FIG. 3 is a side view of the inclined crank mechanism 2 and its vicinity in the direction detector 1 in FIG. 2. In FIG. 3, the case 10 is partly indicated by a chain dotted line. Referring to FIG. 3, the inclined crank mechanism 2 includes a shaft 20 and a rotation member 21.

The shaft 20 is rotated by the driving source 3. The rotation member 21 is coupled to the shaft 20 rotatably around the inclined axis 220 inclined with respect to the shaft 20. As shaft 20 rotates, the rotation member 21 rotates around the inclined axis 220 while fluctuating up and down with respect to the X axis. The inclined axis 220 crosses the X axis at an inclination angle of α.

The shaft 20 includes a rod-shaped main body 201 and an arm member 202. The main body 201 is provided on the X axis. The main body 201 has a rear end coupled to the drive shaft 31. Therefore, the main body 201 is driven by the driving source 3 to rotate around the center axis of the main body 201. The arm member 202 is provided at a tip end of the main body 201.

The arm member 202 extends in a direction crossing the X axis. According to the embodiment, the arm member 202 extends substantially orthogonally to the X axis and has its upper end curved toward the front of the direction detector 1. The arm member 202 has its rear end attached to the main body 201. The arm member 202 has its upper end coupled to the rotation member 21.

Structure of Rotation Member 21

The rotation member 21 is provided in front of the shaft 20 and coupled with the shaft 20 through the arm member 202. The rotation member 21 includes a main body 210 and an inclined shaft 211. The main body 210 is spherical and has a storage chamber 212 having a front part opened. The inclined shaft 211 is provided upright on a surface of the rotation member 21. The inclined shaft 211 is further provided on the inclined axis 220. The inclined shaft 211 has an upper end provided rotatably in a boss of the arm member 202. In this way, the rotation member 21 is attached rotatably around the inclined axis 220 inclined at α deg with respect to the main body 201 of the shaft 20.

Figure 4:
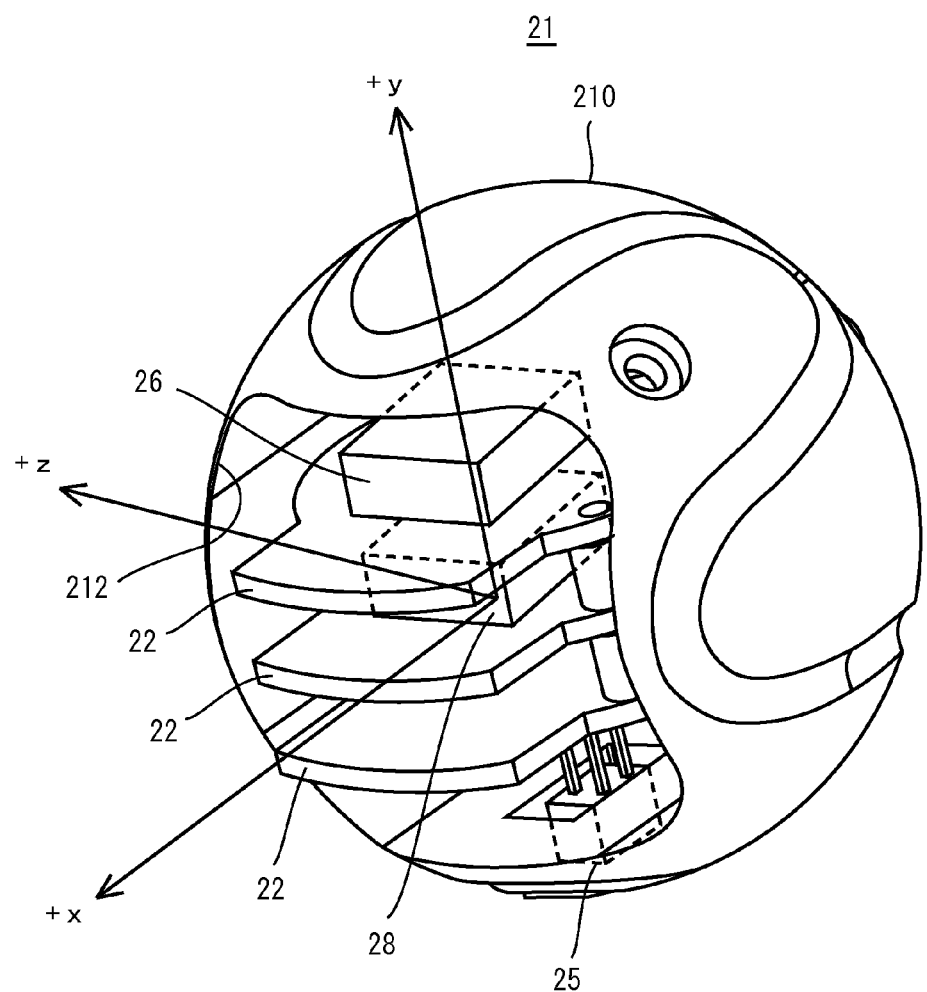
FIG. 4 is a perspective view of a rotation member in FIG. 3.

FIG. 4 is a perspective view of the rotation member 21. Referring to FIG. 4, the rotation member 21 further includes a plurality of substrates 22, an angular velocity sensor 26, an acceleration sensor 28, and a position sensor 25. The plurality of substrates 22 are stored in the storage chamber 212.

The plurality of substrates 22 are provided with gaps among them in the up-down direction in FIG. 4. The angular velocity sensor 26 is attached on the substrate 22 in the uppermost stage. The acceleration sensor 28 is attached on the substrate 22 in the middle stage. The locations to provide the angular velocity sensor 26 and the acceleration sensor 28 are not particularly specified and may be on any of the substrates 22.

The position sensor 25 is provided on the substrate 22 in the lowermost stage. The position sensor 25 includes an optical transmitter and an optical receiver. Referring to FIG. 3, a reflector 29 is provided at a lower part of the case 10. When the direction detector 1 is viewed from the front, the reflector 29 overlaps the Z axis. The optical transmitter in the position sensor 25 outputs light to the outside of the rotation member 21. When the rotation member 21 moves (rotates) to a predetermined position by the driving source 3, light emitted from the optical transmitter is reflected by the reflector 29. When the reflected light is received by the optical receiver in the position sensor 25, the position sensor 25 outputs a detection signal to a control device 30 that will be described. By the above-described operation, the direction detector 1 can determine a rotation starting position of the rotation member 21 by the position sensor 25.

Referring back to FIG. 4, the rotation member 21 further has an xyz rectangular coordinate system. The xyz rectangular coordinate system is fixed to the rotation member 21 unlike the XYZ rectangular coordinate system. As shown in FIG. 4, according to the embodiment, the +x direction is directed toward the front of the rotation member 21. The +y direction coincides with the detection axis of the angular velocity sensor 26 and the detection axis of the acceleration sensor 28.

As will be described, the +y direction is directed in positive and negative directions along each of the U, V, and W axes according to the rotation of the rotation member 21. Therefore, the angular velocity sensor 26 detects an angular velocity around the direction in which the +y direction is directed. The acceleration sensor 28 detects a gravitational acceleration in the direction in which the +y direction is directed.

As described above, the xyz rectangular coordinate system is fixed to the rotation member 21. On the other hand, the XYZ rectangular coordinate system is fixed to the case 10. Therefore, as the rotation member 21 moves (rotates) with respect to the XYZ rectangular coordinate system, the xyz rectangular coordinate system also moves (rotates) with respect to the XYZ coordinate system.

Figure 5:
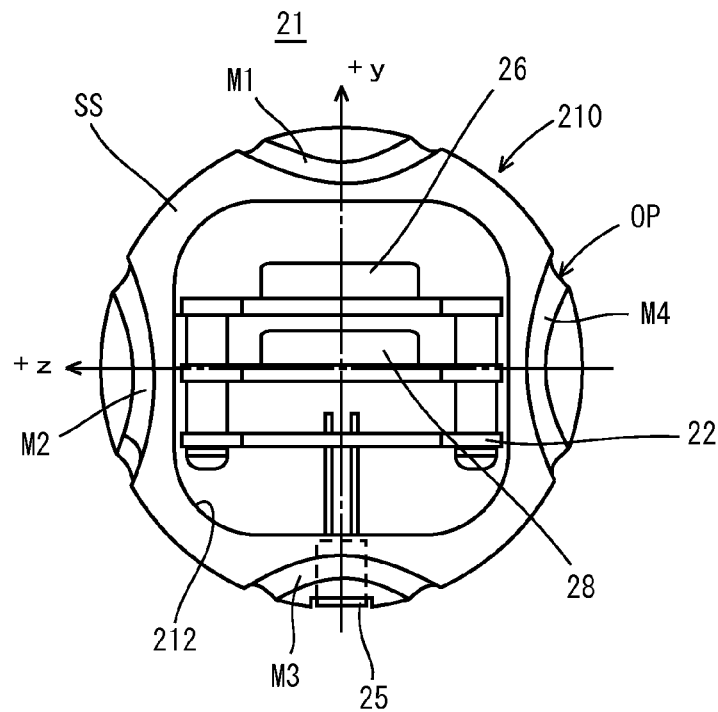
FIG. 5 is a front view of the rotation member in FIG. 3.
Figure 6:
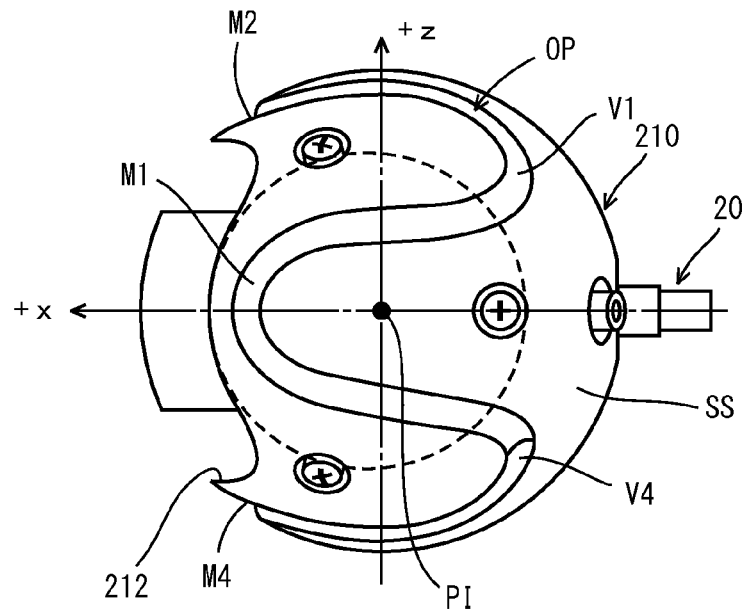
FIG. 6 is a plan view of the rotation member in FIG. 3.
Figure 7:
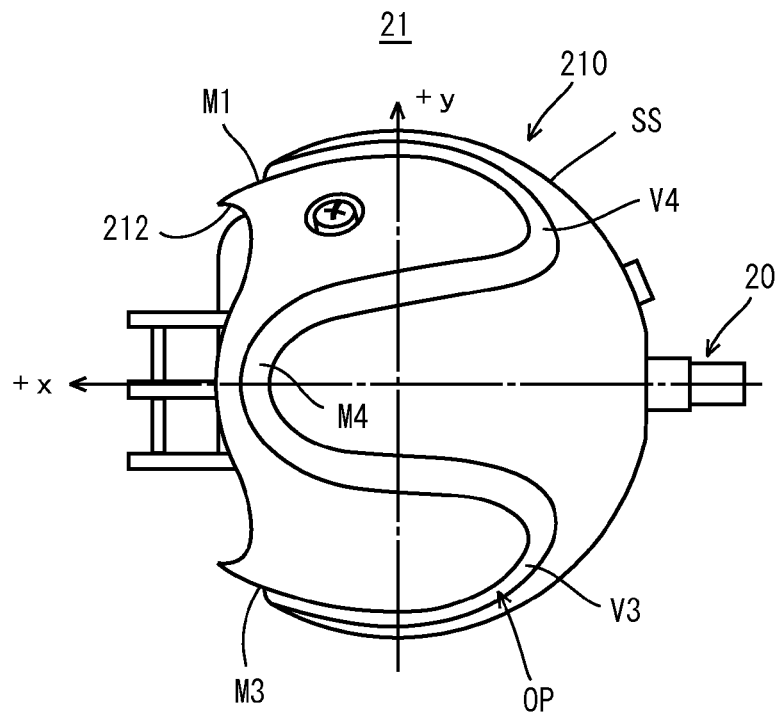
FIG. 7 is a side view of the rotation member in FIG. 3.
Figure 8:
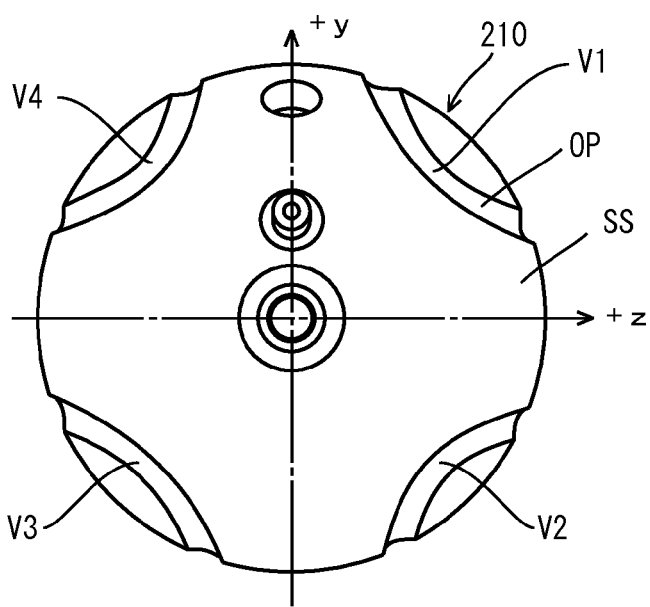
FIG. 8 is a rear view of the rotation member in FIG. 3.

FIG. 5 is a front view of the rotation member 21. FIG. 6 is a plan view of the rotation member 21. FIG. 7 is a side view of the rotation member 21. FIG. 8 is a rear view of the rotation member 21. Referring to FIGS. 5 to 8, the main body 210 has a spherical surface SS. The spherical surface SS has an orbit portion OP. According to the embodiment, the orbit portion OP is a groove formed at the spherical surface SS. The orbit portion OP is formed around the x-axis and has a plurality of mountain-like portions M1 to M4 having a ridge in the +x direction and a plurality of valley-like portions V1 to V4 having a ridge in the −x direction. In short, according to the embodiment, the orbit portion OP is a zigzag-shaped groove that extends around the x-axis. Referring to FIGS. 4 to 7, the opening of the storage chamber 212 has a rectangular shape and the corners of the shape correspond to the locations of the four valley-like portions V1 to V4. In this way, the storage chamber 212 may be formed to have a large capacity without overlapping the orbit portion OP.

Figure 9:
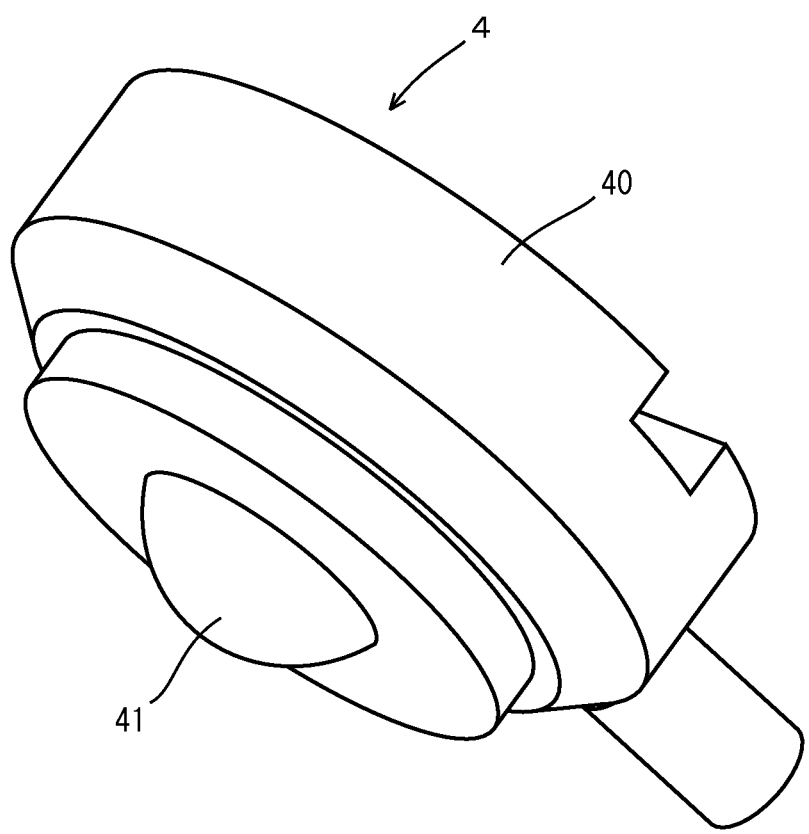
FIG. 9 is a perspective view of a guide member in FIG. 2.

Referring to FIGS. 2 and 3, the plurality of guide members 4 (4A to 4C) are secured to the case 10. The guide members are each provided on the same YZ plane. FIG. 9 is a perspective view of the guide member 4. Referring to FIG. 9, the guide member 4 includes a base 40 and a ball 41. The ball 41 is attached rotatably at a lower end of the base 40.

Figure 10:
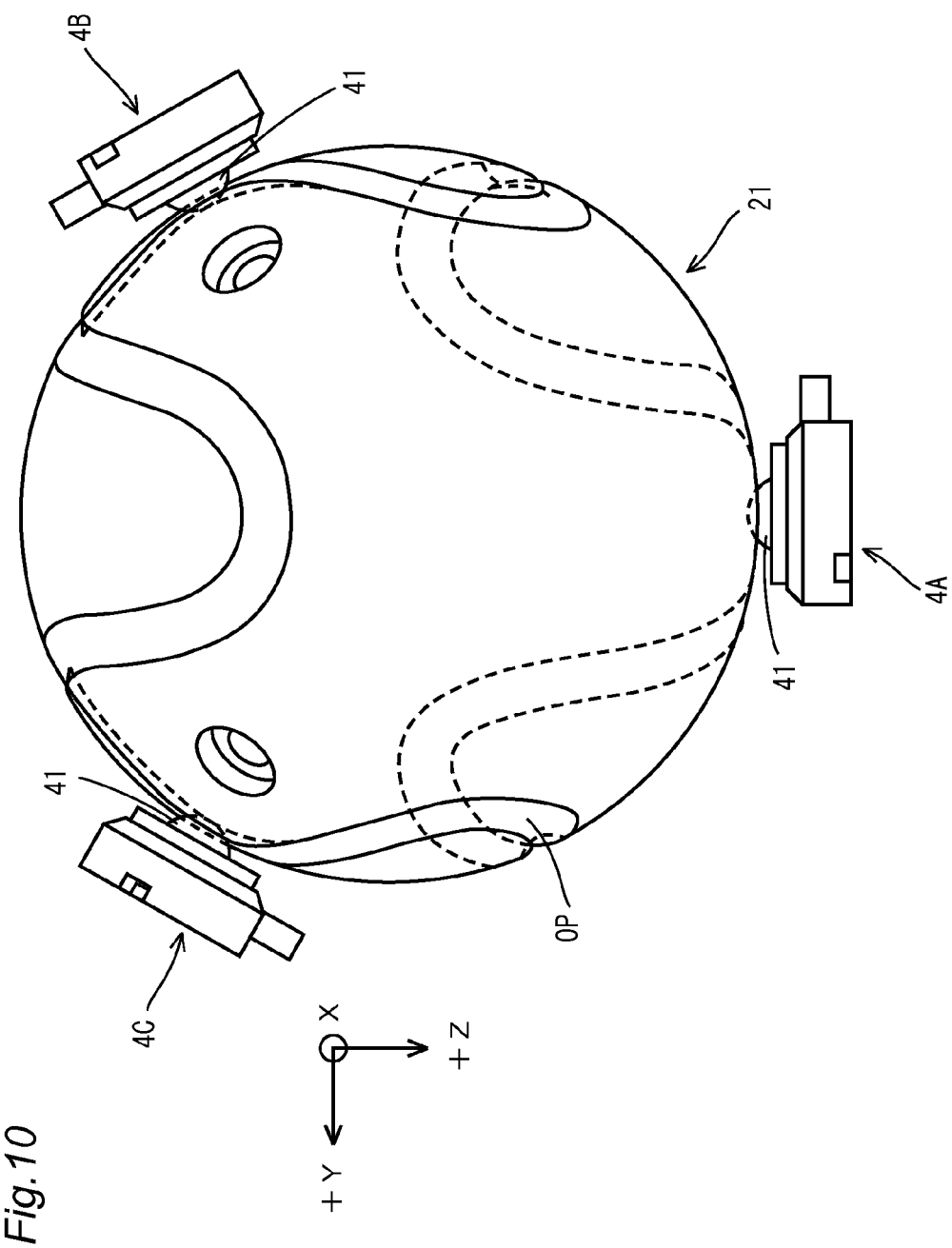
FIG. 10 is a view showing a positional relation between the rotation member and each of the guide members in an XYZ rectangular coordinate system.

FIG. 10 is a view showing a positional relation between the rotation member 21 and the guide members 4 in the XYZ rectangular coordinate system. Referring to FIG. 10, according to the embodiment, the three guide members 4A to 4C are fixed to the XYZ rectangular coordinate system. The guide members 4A to 4C are provided at equal intervals around the X axis. Stated differently, the guide members 4A to 4C are provided at intervals of 120 deg around the X axis. According to the embodiment, the guide member 4A is provided on the Z axis (on the +Z direction side). The guide member 4B is provided 120 deg rotated counterclockwise around the X axis from the guide member 4A and the guide member 4C is provided in a position 240 deg rotated when viewed from the front of the direction detector 1.

The balls 41 of the guide members 4A to 4C are inserted in the grooved orbit portion OP and contact the orbit portion OP. The rotation member 21 is rotatably supported at the case 10 by the guide members 4A to 4C. As the rotation member 21 rotates, the balls 41 move on the orbit portion OP. Therefore, the manner of rotation of the rotation member 21 depends of the shape of the orbit portion OP.

Relation Between UVW Coordinate System and XYZ Rectangular Coordinate System

Figure 11:
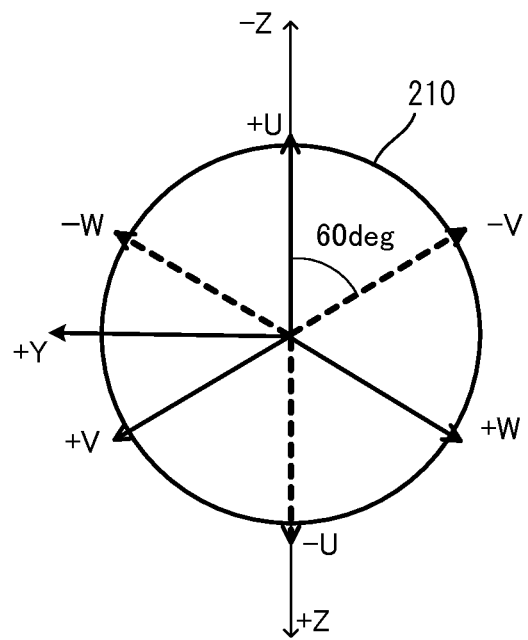
FIG. 11 is a view showing a relation between the XYZ rectangular coordinate system and a UVW coordinate system.
Figure 12:
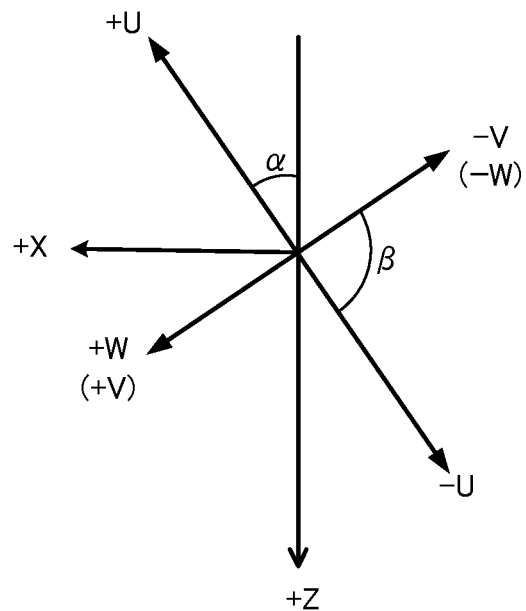
FIG. 12 is another view showing a relation between the XYZ rectangular coordinate system and the UVW coordinate system.

As described above, the direction detector 1 is provided within the XYZ rectangular coordinate system. The embodiment also takes account of a UVW rectangular coordinate system. A relation between the XYZ rectangular coordinate system and the UVW rectangular coordinate system is shown in FIGS. 11 and 12. FIG. 11 is a view of a YZ plane as seen in the −X direction from the +X direction, while FIG. 12 is a view of a ZX plane (a right side view of FIG. 11) as seen in the +Y direction from the −Y direction. An elevation angle formed between the U, V, and W axes and the YZ plane is defined as α deg. More specifically, the inclination angle α of the inclined axis 220 with respect to the shaft 20 coincides with the elevation angle. Furthermore, a crossing angle formed by the U, V, and W axes among one another is defined as β.

The six axes, +U, −U, +V, −V, +W, and −W are always provided apart at intervals of 60 deg on the YZ plane. More specifically, referring to FIG. 11, the +U axis projected vertically on the YZ plane matches the −Z axis. The −U axis projected vertically on the YZ plane matches the +Z axis. The −W axis projected vertically on the YZ plane forms an angle of 60 deg with respect to the −Z axis. The +W axis projected vertically on the YZ plane forms an angle of 60 deg with respect to the +Z axis. The +V axis projected vertically on the YZ plane forms an angle of 60 deg with respect to +Z axis. The −V axis projected vertically on the YZ plane forms an angle of 60 deg with respect to the −Z axis. Among the six axes, +U, −U, +V, −V, +W, and −W axes in FIG. 11, the axes in the dotted lines extend behind beyond the surface of the sheet of FIG. 11 and the axes in solid lines extend forward from the surface of the sheet of FIG. 11. The elevation angle α is preferably from 30 deg to 40 deg, and the most preferable elevation angle $\alpha = \tan^{-1}(1/\sqrt{2}) = 35.26$ deg. The crossing angle β is most preferably 90 deg. In the following description, α is 35.26 deg and β is 90 deg.

Also in the following description, in the xyz rectangular coordinate system, the x axis on the +x side will be referred to as the "+x axis" and the x axis on the −x axis side will be referred to as the "−x axis." The other axes will also be defined in the same manner as the x axis. The axes in the other coordinate systems (the XYZ rectangular coordinate system and the UVW coordinate system) will be defined in the same manner to the x-axis.

The origins of the XYZ rectangular coordinate system, the xyz rectangular coordinate system, and the UVW rectangular coordinate system are all at the center point of the main body 210 of the rotation member 21.

Operation of Direction Detector 1

The direction detector 1 measures rotational angular velocities $\omega_U$, $\omega_V$ and $\omega_W$ around each of the axes of the UVW rectangular coordinate system and gravitational accelerations $g_U$, $g_V$, and $g_W$ in the each axis direction. Then, the direction detector 1 coordinate-transforms the measured rotational angular velocities $\omega_U$, $\omega_V$ and $\omega_W$ and gravitational accelerations $g_U$, $g_V$, and $g_W$ into rotational angular velocities $\omega_X$, $\omega_Y$ and $\omega_Z$ and gravitational accelerations $g_X$, $g_Y$, and $g_Z$ in the XYZ rectangular coordinate system. The direction detector 1 then produces an azimuth angle ψ based on the rotational angular velocities $\omega_X$, $\omega_Y$ and $\omega_Z$ and the gravitational accelerations $g_X$, $g_Y$, and $g_Z$. In the direction detector 1, the angular velocity sensor 26 and the acceleration sensor 28 are fluctuated only by ±α deg with respect to the YZ plane. Therefore, the rotation angle is small so that a larger space required by a conventional direction measuring device is not necessary.

When the rotational angular velocities $\omega_U$, $\omega_V$, and $\omega_W$ and gravitational accelerations $g_U$, $g_V$, and $g_W$ in the UVW rectangular coordinate system are measured, it is necessary to cause the direction of the detection axis of the angular velocity sensor 26 and the acceleration sensor 28 (the +y axis according to the embodiment) to be directed in the positive and negative directions of each of the U, V, and W axes by the rotation of the rotation member 21.

When the rotation member 21 rotates in contact with the plurality of guide members 4A to 4C by the rotation of the shaft 20, the orbit portion OP has such a shape that the +y axis of the rotation member 21 is sequentially directed in the positive and negative directions of the U axis, V axis, and the W axis.

Track of +y Axis when Rotation Member 21 Rotates

First, the track of the +y axis when the rotation member 21 rotates will be described.

Figure 13:
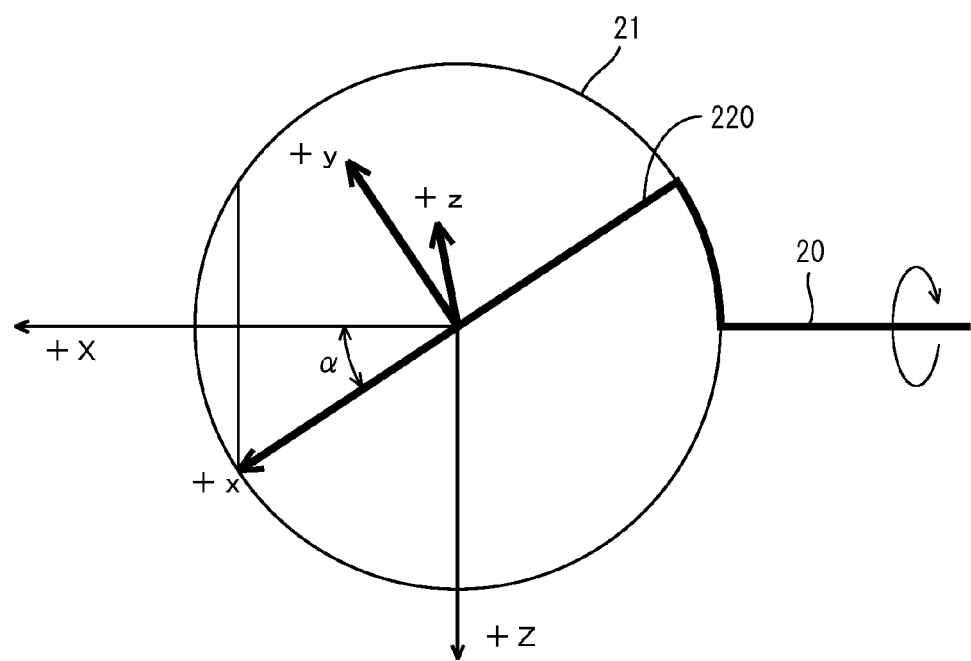
FIG. 13 is a schematic view showing a relation between the XYZ rectangular coordinate system and an xyz rectangular coordinate system when viewed in a +Y direction.

To start with, a relation between the XYZ rectangular coordinate system fixed to the case 10 and the xyz rectangular coordinate system fixed to the rotation member 21 will be described. FIG. 13 is a schematic view showing a relation between the XYZ rectangular coordinate system and the xyz rectangular coordinate system as viewed in the +Y direction. Referring to FIG. 13, the x-axis coincides with the inclined axis 220. Therefore, the angle formed by the x-axis and the X axis is α deg. The y-axis is provided on the XZ plane when the rotation member 21 is provided in a position shown in FIG. 13. Referring to FIGS. 12 and 13, the +y axis coincides with the +U axis when the rotation member 21 is provided in the position shown in FIG. 13. In the following description, the position shown in FIG. 13 is defined as the rotation starting position of the rotation member 21. Note that the position sensor 25 outputs a detection signal to the control device 30 (see FIG. 19) when the rotation member 21 moves to the position in FIG. 13.

Figure 14:
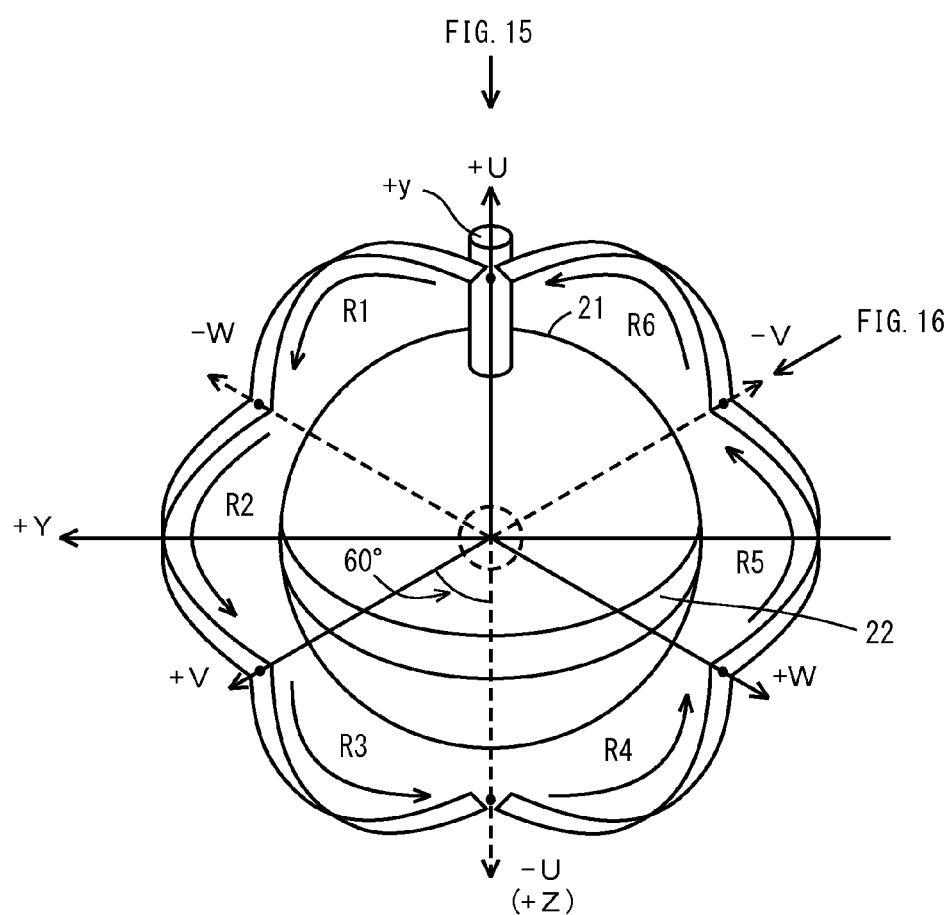
FIG. 14 is a front view of the rotation member provided in a rotation starting position.
Figure 15:
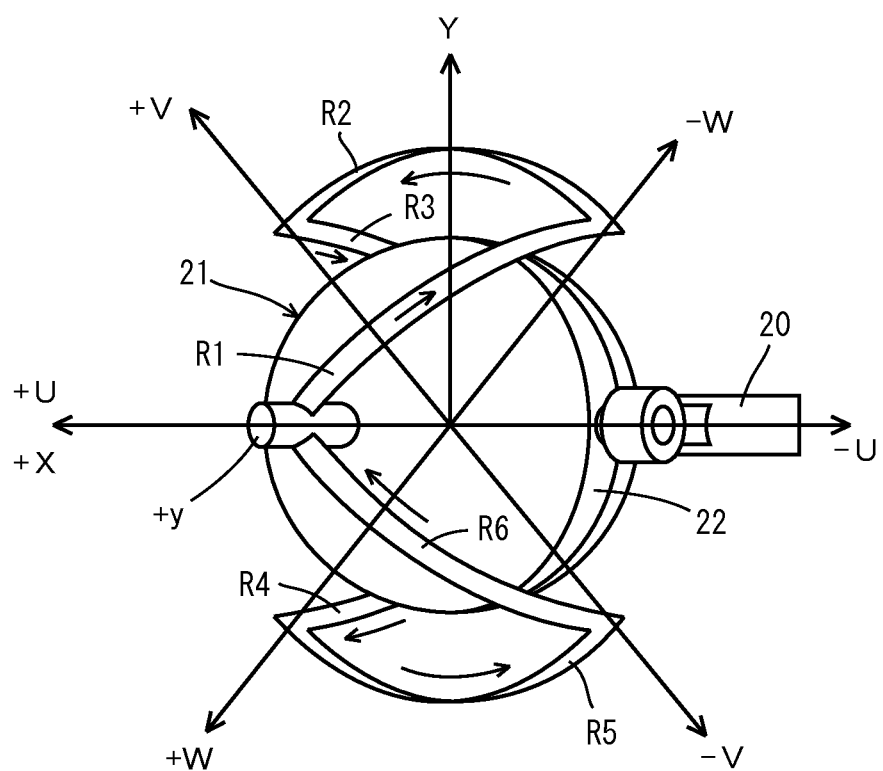
FIG. 15 is a view of the rotation member in the rotation starting position as viewed in the +Z direction from the −Z direction.
Figures 16, 17:
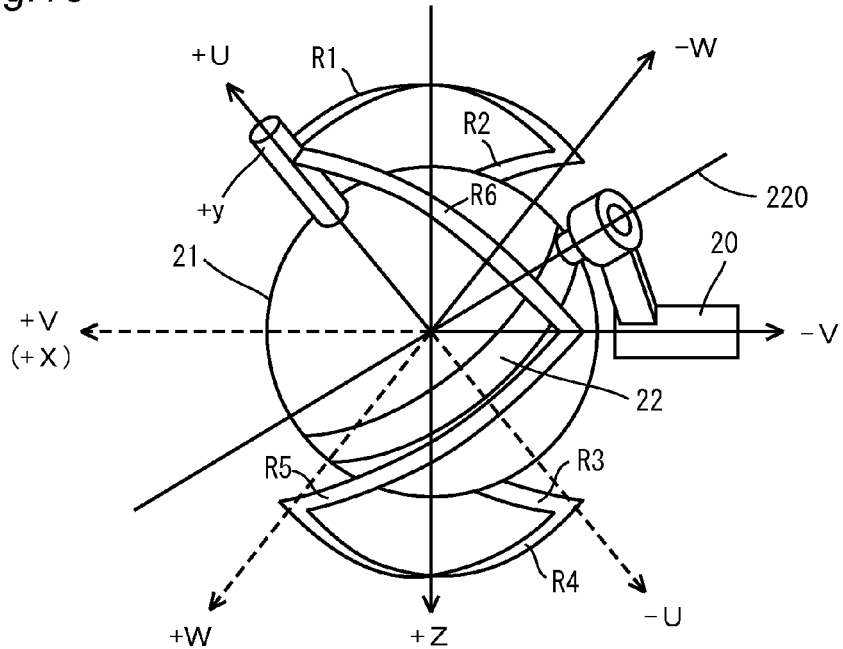
FIG. 16 is a view of FIG. 14 as viewed in a direction 60 deg rotated clockwise around the X axis from the position shown in FIG. 15.
FIG. 17 is a table showing a relation between the rotation position of the shaft in FIG. 3 and the direction in which the +y axis is directed in FIG. 13.

FIG. 14 is a front view of the rotation member 21 when the rotation member 21 is provided in the rotation starting position, in other words, a view as seen in the −X direction from the +X direction. FIG. 15 is a view of the rotation member 21 in the rotation starting position as seen in the +Z direction from the −Z direction. FIG. 16 is a view of FIG. 14 as seen from a direction rotated 60 deg clockwise around the X axis from the position in FIG. 15.

The +y axis shown in FIGS. 14 to 16 has a rod shape. Referring to FIGS. 14 to 16, the +y axis coincides with the +U axis in the rotation starting position as described above.

As described above, when the rotational angular velocities $\omega_U$, $\omega_V$, and $\omega_W$ and the gravitational accelerations $g_U$, $g_V$, and $g_W$ in the UVW rectangular coordinate system are measured, the direction detector 1 must direct the +y axis that coincides with the detection axis of the angular velocity sensor 26 and the acceleration sensor 28 in the positive and negative directions of the U, V, and W axes by rotating the rotation member 21.

In the example shown in FIGS. 14 to 16, the direction detector 1 directs the +y axis in the order of the +U axis, −W axis, +V axis, −U axis, +W axis, and −V axis (and +U axis). At the time, the +y axis moves in the order of tracks R1, R2, R3, R4, R5, and R6 (and to R1). Note that the order in which the +y axis is directed in the positive and negative directions of the U, V, and W axes is not limited to the above-described order. As will be described, the +y axis may be directed in the positive and negative directions of the U, V, and W axes in a different order from the above.

FIG. 17 is a table showing a relation among the directed direction of the +y axis, the rotation position of the shaft 20, and the rotation amount of the +y axis around the X axis. Referring to FIG. 17, the rotation position of the shaft 20 indicates the rotational angle of the shaft 20 as it rotates counterclockwise around the X axis as viewed in the −X direction with respect to the rotation starting position. The rotation position of the shaft 20 is 0 deg when the rotation member 21 is in the rotation starting position.

As the shaft 20 rotates from 0 deg to 1440 deg, the +y axis is directed in the order of the +U axis, −W axis, +V axis, −U axis, +W axis, and −V axis (and the +U axis). For example, when the shaft 20 rotates from 0 deg to 240 deg counterclockwise as viewed in the −X direction, the +y axis moves from the +U axis to the −W axis (see FIGS. 14 to 16). At the time, the +y axis rotates 60 deg around the X axis. Similarly, when the +y axis moves in the order of tracks R2, R3, R4, R5, and R6, the shaft 20 rotates 240 deg and the +y axis rotates 60 deg around the X axis.

Rotation of Rotation Member 21 Around +y Axis

When the +y axis moves toward the positive and negative directions of the U, V, and W axes, the rotation member 21 rotates around the +y axis.

First, the reason why the rotation member 21 rotates around the +y axis will be described. The rotation member 21 rotates around the inclined axis 220 (x-axis) according to the rotation of the shaft 20. As the rotation member 21 rotates around the x-axis, the guide members 4A to 4C move on the orbit portion OP. The orbit portion OP is a zigzag groove that extends around the +x axis, the rotation member 21 rotates around the +y axis as the guide members 4A to 4C move on the orbit portion OP. The rotation around the +y axis means rotation movement around the y-axis as the center axis. Therefore, when the +y axis moves in the positive and negative directions of the U, V, and W axes, the angular velocity sensor 26 outputs angular velocities according to the rotation around the +y axis.

Figure 18:
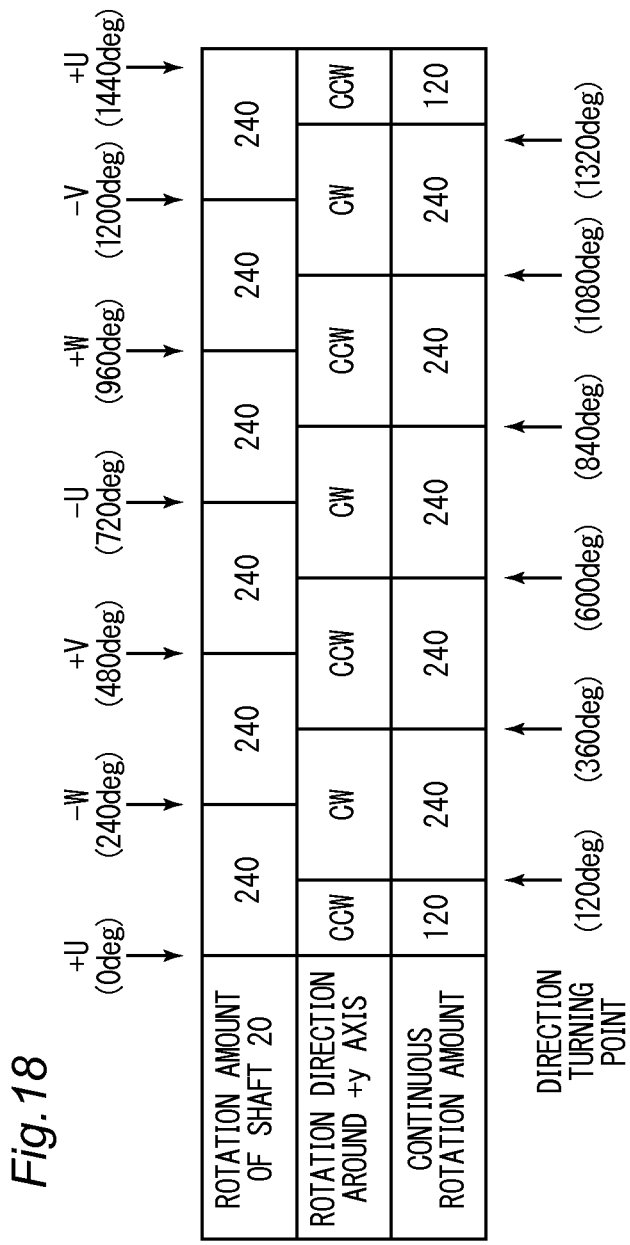
FIG. 18 is a table showing a relation between the rotation position of the shaft in FIG. 3 and the rotation direction around the +y axis in FIG. 13.

The rotation direction around the +y axis changes depending on the rotation position of the shaft 20. FIG. 18 is a table showing a relation of how the rotation position of the shaft 20 corresponds to the rotation direction of the +y axis. Referring to FIG. 18, the rotation direction of the +y axis "CW" indicates the clockwise direction as viewed in the −y direction, and "CCW" indicates the counterclockwise direction as viewed in the −y direction. The direction turning point is the rotation position of the shaft 20 when the rotation direction around the +y axis changes. The amount of continuous rotation is equal to the necessary amount of rotation for the shaft 20 before the rotation direction around the +y axis changes next.

When for example the +y axis moves from the +U axis to the −W axis (moves on the track R1), the rotation member 21 rotates counterclockwise around the +y axis as the shaft 20 rotates. Until the rotation position of the shaft 20 reaches a direction turning point (120 deg) from the rotation starting position, the rotation member 21 continues to rotate counterclockwise around the +y axis. When the rotation position of the shaft 20 exceeds 120 deg, the rotation around the +y axis changes from counterclockwise to clockwise. The rotation member 21 continues to rotate clockwise around the +y axis until the +y axis is directed in the −W direction.

Thereafter, when the +y axis moves from the −W axis to the +V axis (moves on the track R2), the rotation member 21 continues to rotate clockwise around the +y axis until the rotation position of the shaft 20 reaches a direction turning point (360 deg). When the rotation position of the shaft 20 exceeds the direction turning point (360 deg), the rotation around the +y axis changes from clockwise to counterclockwise. The rotation member 21 continues to rotate counterclockwise around the +y axis until the +y axis is directed in the +V direction.

When the +y axis moves along the tracks R3, R4, R5, and R6, the rotation direction around the +y axis also changes every time the rotation position of the shaft 20 reaches a direction turning point. More specifically, the rotation direction around the +y axis changes every time the shaft 20 rotates 240 deg.

Note that when the shaft 20 rotates clockwise as viewed in the −X direction, the rotation direction around the +y axis is reversed from that in FIG. 18. When for example the shaft 20 is rotated clockwise and the +y axis is thus moved from the −W axis to the +U axis, the +y axis first rotates in the counterclockwise direction (CCW). Then, when the rotation position is smaller than a direction turning point (120 deg), the rotation around the +y axis changes to the clockwise direction (CW).

The rotation direction around the +y axis changes when the rotation position of the shaft 20 is equal to 120 deg, 360 deg, 600 deg, 840 deg, 1080 deg, and 1320 deg (the direction turning points). When the rotation position of the shaft 20 reaches a direction turning point, any of the guide members 4A to 4C passes the mountain-like portion M1 positioned in the immediate vicinity of the crossing point PI (see FIG. 6) between the +y axis and the spherical surface SS among the mountain-like portions M1 to M4 and the valley-like portions V1 to V4 of the orbit portion OP. At the time, the moving direction of the guide members 4A to 4C with respect to the rotation member 21 is reversed, the rotation direction around the y-axis changes. More specifically, while the detection axis (+y axis) of the angular velocity sensor moves from a predetermined measuring direction (the +U axis for example) to another measuring direction (the −V axis for example), the rotation direction of the angular velocity sensor around the detection axis (+y axis) changes.

Structure of Control Device 30

Figure 19:
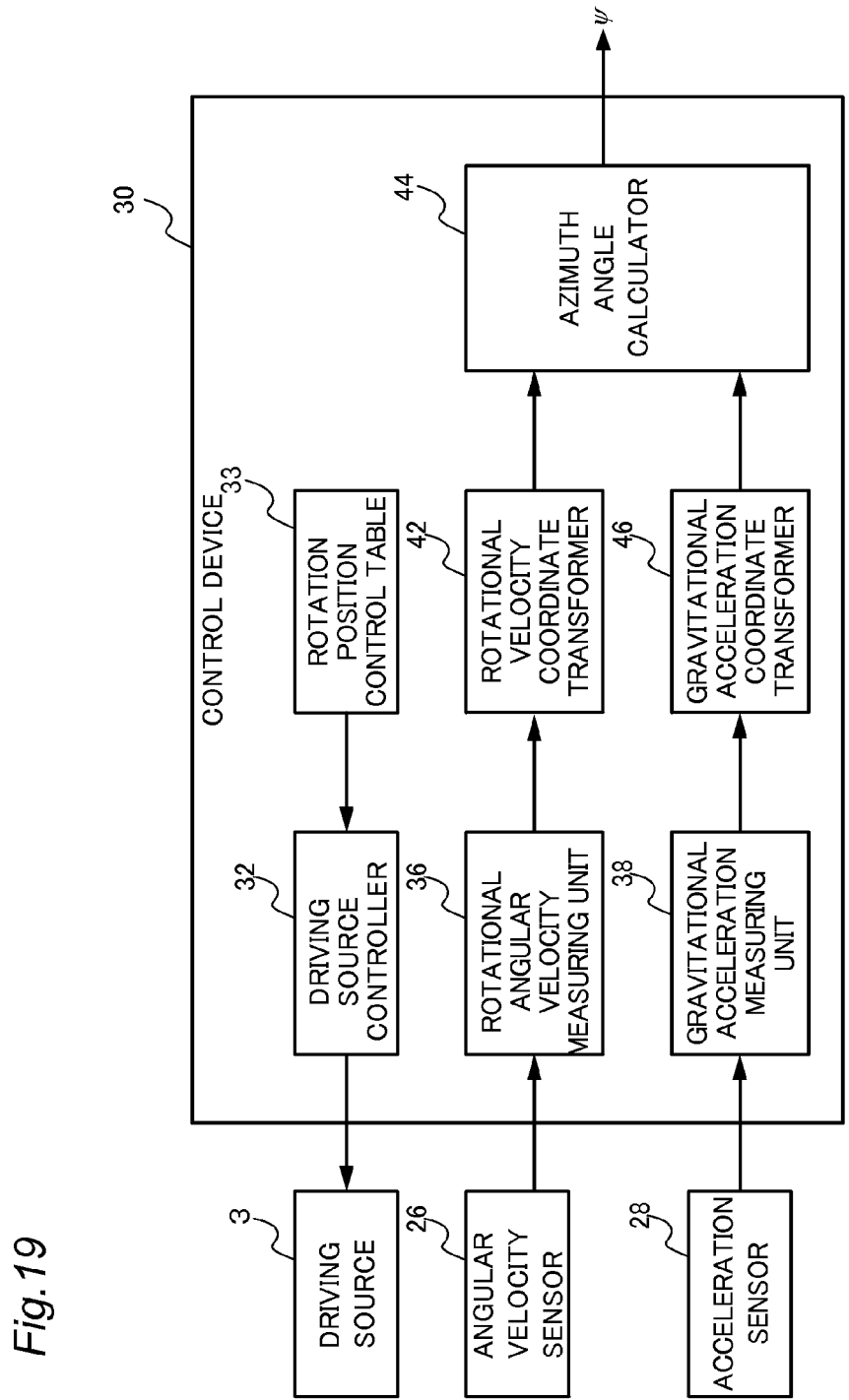
FIG. 19 is a functional block diagram showing a configuration of a control device provided in the direction detector in FIG. 1.

Referring to FIG. 19, the direction detector 1 further includes the control device 30 including a computer and the like. The control device 30 controls the attitude changer 100. The control device 30 is connected with the angular velocity sensor 26, the acceleration sensor 28, and the position sensor 25 in the rotation member 21 by wired or wireless connection.

The control device 30 includes a driving source controller 32, a rotation position control table 33, a rotational angular velocity measuring unit 36, a gravitational acceleration measuring unit 38, a rotational angular velocity coordinate transformer 42, a gravitational acceleration coordinate transformer 46, and an azimuth angle calculator 44.

The driving source controller 32 controls the driving source 3 based on the rotation position control table 33 in which the rotation amount of the shaft 20 is set. The rotation position control table 33 is stored in a storage device that is not shown.

The rotational angular velocity measuring unit 36 measures angular velocities detected by the angular velocity sensor 26 within a predetermined time period as rotational angular velocities $\omega_U$, $\omega_V$, and $\omega_W$. The rotational angular velocities $\omega_U$, $\omega_V$, and $\omega_W$ are rotational angular velocity components around the axial directions of the U, V, and W axes. The gravitational acceleration measuring unit 38 measures gravitational accelerations $g_U$, $g_V$, and $g_W$ detected by the acceleration sensor 28. The gravitational accelerations $g_U$, $g_V$, and $g_W$ are gravitational acceleration components in the axial directions of the U, V, and W axes.

The rotational angular velocity coordinate transformer 42 coordinate-transforms the rotational angular velocities $\omega_U$, $\omega_V$, and $\omega_W$ measured by the rotational angular velocity measuring unit 36 into rotational angular velocities $\omega_X$, $\omega_Y$, and $\omega_Z$. The gravitational acceleration coordinate transformer 46 coordinate-transforms the gravitational accelerations $g_U$, $g_V$, and $g_W$ measured by the gravitational acceleration measuring unit 38 into gravitational accelerations $g_X$, $g_Y$, and $g_Z$.

The azimuth angle calculator 44 calculates an azimuth angle $\psi$ based on the rotational angular velocities $\omega_X$, $\omega_Y$, and $\omega_Z$ obtained by the rotational angular velocity coordinate transformer 42 and the gravitational accelerations $g_X$, $g_Y$, and $g_Z$ obtained by the gravitational acceleration coordinate transformer 46.

Rotation Position Control Table 33

Referring to FIG. 20, the rotation position control table 33 includes the order of directing the +y axis in the positive and negative directions of the U, V, and W axes. Unlike the order shown in FIG. 16, the +y axis starts from the +U axis in the rotation starting position and is directed in the order of the −U axis, +U axis, +V axis, −V axis, +V axis, +W axis, −W axis, +W axis, and +U axis. The position of the shaft when the +y axis coincides with the +U axis is the rotation starting position (rotation angle=0 deg) for the shaft 20.

The rotational angular velocity $\omega_U$ is obtained by calculating the difference between the rotational angular velocity of the +U axis and the rotational angular velocity of the −U axis. The rotational angular velocity $\omega_V$ and the rotational angular velocity $\omega_W$ are obtained in the same manner. In this way, the inherent bias of the angular velocity sensor 26 is canceled.

The reason why the rotational angular velocity of the +U axis is measured twice, once each before and after measuring the rotational angular velocity of the −U axis will be described. The angular velocity output of the angular velocity sensor 26 includes an inherent offset of the angular velocity sensor 26. The offset changes depending on operation conditions including temperature as well as drift. The drift refers to a phenomenon in which the offset increases (or decreases) over time. The direction detector 1 carries out measurement for the +U axis twice before and after the measurement for the −U axis in order to obtain a change ratio about the offset according to the drift. The drift is removed from the measured angular velocity based on the obtained change ratio. The measurement for the +V axis and +W axis are also carried out twice for the same reason.

The rotational angular velocity of the +U axis is measured first and the rotational angular velocity of the +U axis is measured last also in order to remove the drift. At the end of the measurement, the rotational angular velocity component in the rotation starting position (+U axis) is measured, so that a change ratio for the offset generated during the period for the series of measurement necessary for obtaining the azimuth angle ψ can be obtained.

In the rotation position control table 33, the rotation position of the shaft 20 is the same as the rotation position shown in FIG. 17. The rotation position refers to the rotation angle of the shaft 20 necessary for directing the +y axis from the rotation starting position to each axial direction.

The rotation amount refers to the rotation angle of the shaft 20 when the +y axis is directed from the present axial direction to the next axial direction. The sign of the rotation amount indicates the rotation angle of the shaft 20. The sign "+" indicates the counterclockwise direction as viewed in the −X direction and the sign "−" indicates the clockwise direction as viewed in the −X direction. For example, the rotation amount of the −U axis is set to +720 deg. Therefore, when the +y axis is moved from the +U axis to the −U axis, the control device 30 rotates the shaft 20 by 720 deg counterclockwise as viewed in the −X direction.

A control flag indicates whether the control device 30 rotates the shaft 20 by normal rotation control or excess rotation control. The control flag being 0 indicates execution of the normal rotation control and the control flag being 1 indicates execution of the excess rotation control. The normal rotation control and the excess rotation control will later be described in detail.

Basic Operation of Control Device 30

Basic operation carried out by the control device 30 to direct the +y axis in each of the axial directions will be described.

First, the operation of the control device 30 to carry out the normal rotation control will be described by referring to an example of how the +y axis is moved from the +U axis to the −U axis. In the following description, unless otherwise specified, the gravitational acceleration is measured simultaneously with the rotational angular velocity though the measurement of the gravitational acceleration will not be described.

Referring to FIG. 20, after the first measurement of the rotational angular velocity of the +U axis, the control device 30 carries out the normal rotation control because the control flag for the −U axis is set to 0. The normal rotation control is processing to rotate the shaft 20 by a rotation amount set in the rotation position control table 33. The control device 30 rotates the shaft 20 by the rotation amount (+720 deg) set for the −U axis. As a result, the +y axis reaches the −U axis after passing the −W axis and the +V axis (see FIG. 14).

Now, the operation of the control device 30 to carry out the excess rotation control will be described by referring to an example of how the +y axis moves from +U axis to the +V axis.

After the second measurement of the rotational angular velocity of the +U axis, the control device 30 carries out the excess rotation control and moves the +y axis from the +U axis to the +V axis because the control flag for the +V axis as the next measurement target is set to 1.

In the rotation position control table 33, +480 deg is set as a rotation amount during movement from the +U axis to the +V axis. The control device 30 adds a preset excess amount (such as 40 deg) to +480 deg and produces +520 deg. The control device 30 rotates the shaft 20 by 520 deg (excess rotation) in the counterclockwise direction as viewed in the −X direction. Thereafter, the +y axis passes the −W axis and the +V axis once (see FIG. 14). More specifically, the +y axis moves to the partway of the track R3 (between the +V axis and the −U axis) by the excess rotation.

Thereafter, the control device 30 reversely rotates the shaft 20 (which has been rotated +520 deg) by an excess amount. More specifically, the control device 30 rotates the shaft 20 by 40 deg clockwise as viewed in the −X direction. The +y axis that has already passed the +V axis reversely rotates to reversely follow the track R3 and reaches the +V axis.

Now, the reason for carrying out the excess rotation control will be described.

If for example only the normal rotation control is used while the +y axis moves in the order of the +U axis, +V axis, and −V axis, the control device 30 cannot correctly measure the rotational angular velocity $\omega_V$.

Figure 21:
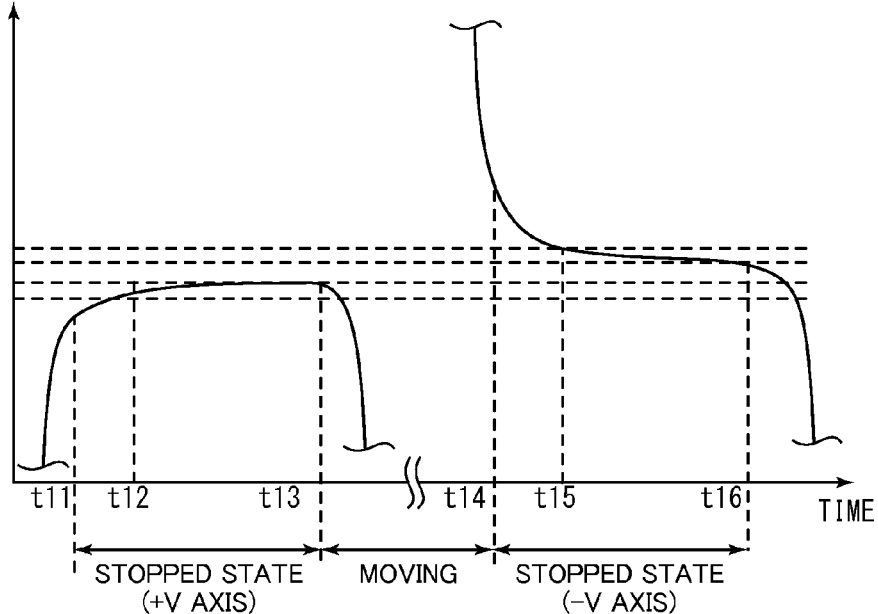
FIG. 21 is a graph showing an example of change over time in the angular velocity output of the angular velocity sensor in FIG. 4.

FIG. 21 is a graph showing change in the angular velocity detected by the angular velocity sensor 26 over time when the normal rotation control is carried out while the +y axis is moved from the +U axis to the +V axis and from the +V axis to −V axis.

Referring to FIGS. 18, 20, and 21, when the +y axis moves from the +U axis to the +V axis by the normal rotation control, the control device 30 rotates the shaft 20 by +480 deg. The +y axis reaches the +V axis while being rotated around the +y axis by the rotation of the shaft 20. The angular velocity sensor 26 outputs an angular velocity associated with the rotation around the y-axis (hereinafter referred to as the "moving angular velocity") during the movement of the +y axis.

The +y axis reaches the +V axis at time W. The rotation direction around the +y axis immediately before reaching the +V axis is counterclockwise and therefore the angular velocity sensor 26 outputs a negative angular velocity before time t11. The +y axis stops at the +V axis at time t11, and thereafter the angular velocity output continues to increase. This is because the moving angular velocity is included in the angular velocity output even after the y axis stops because of the effect of the time constant of the angular velocity sensor 26.

The angular velocity output during a period immediately after the +y axis stops at the +V axis (from time t11 to t12) greatly changes by the effect of the time constant and is not stable. In order to reduce the effect of the time constant, the control device 30 measures the angular velocity output from the angular velocity sensor 26 during a predetermined period (from time t12 to t13) as a rotational angular velocity of the +V axis. However, the effect of the time constant still remains during the predetermined period, and therefore the rotational angular velocity of the +V axis continues to increase if only slightly. More specifically, the rotational angular velocity of the +V axis includes an error associated with the time constant that increases over time.

Thereafter, the shaft 20 rotates +720 deg and the +y axis moves from the +V axis to the −V axis (from time t13 to t14). Since the +y axis rotates clockwise around the +y axis immediately before reaching the −V axis, the angular velocity sensor 26 outputs a positive angular velocity immediately before time t14. The angular velocity output at time t14 at which the +y axis stops at the −V axis and thereafter continues to decrease by the effect of the time constant. Therefore, the rotational angular velocity of the −V axis measured from time t15 to t16 includes an error associated with the time constant that decreases over time. The characteristic of the error associated with the time constant included in the rotational angular velocity of the −V axis is opposite to the characteristic of the error associated with the time constant included in the rotational angular velocity of the +V axis.

The rotational angular velocity $\omega_{V+}$ of the +V axis and the rotational angular velocity $\omega_{V-}$ of the −V axis can be represented as follows.

$$\omega_{V+} = \omega_{V+True} + V + \delta_1 \quad (1)$$

$$\omega_{V-} = \omega_{V-True} + V + \delta_2 \quad (2)$$

In the above expressions, $\omega_{V+True}$ is a true rotational angular velocity of the +V axis free of the above-described error and $\omega_{V-True}$ is a true rotational angular velocity of the −V axis. $\omega_{V+True}$ and $\omega_{V-True}$ have the same absolute value and different signs. V is an offset. $\delta_1$ is the error associated with the time constant included in the rotational angular velocity $\omega_{V+}$ of the +V axis. $\delta_2$ is the error associated with the time constant included in the rotational angular velocity $\omega_{V-}$. The rotational angular velocity $\omega_V$ can be obtained by subtracting Expression (2) from Expression (1). The offset is canceled by the subtraction. Since the characteristic of the error $\delta_1$ associated with the time constant is however reversed from the characteristic of the error $\delta_2$ associated with the time constant, the error $\delta_2$ associated with the time constant is not canceled by the error $\delta 1$ associated with the time constant by the above-described subtraction and is conversely added to the error $\delta 1$ associated with the time constant. In this way, if the normal rotation control is used for movement from the +U axis to the +V axis and from the +V axis to the −V axis, the error associated with the time constant increases. The control device 30 cannot measure the rotational angular velocity $\omega_V$ correctly and cannot detect true north correctly.

The control device 30 therefore carries out the excess rotation control in order to reduce the error associated with the time constant included in the rotational angular velocity $\omega_V$ when the +y axis is moved from the +U axis to the +V axis. Note that the normal rotation control is carried out when the +y axis moves from the +V axis to −V axis.

Figure 22:
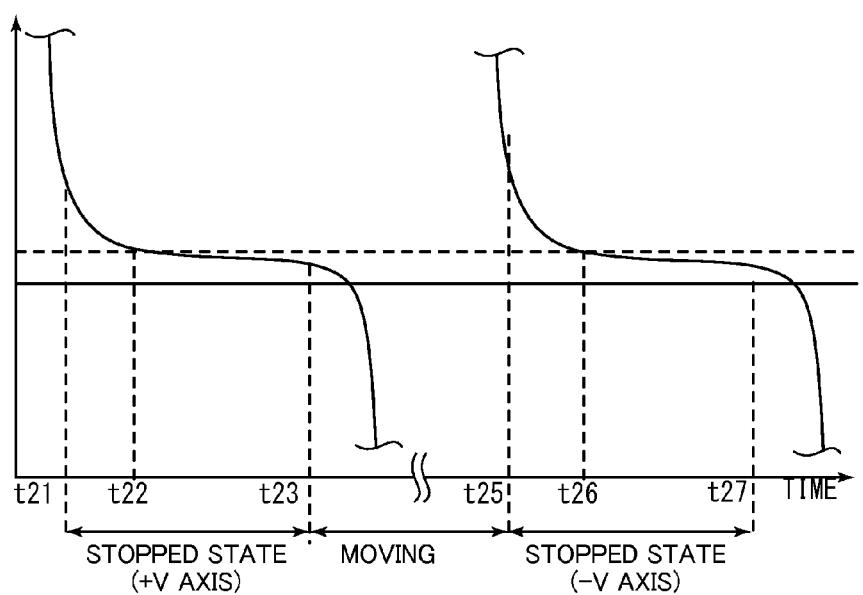
FIG. 22 shows another example of change over time in the angular velocity output of the angular velocity sensor in FIG. 4.

FIG. 22 is a graph showing change in the angular velocity output of the angular velocity sensor 26 over time when the excess rotation control is carried out for movement from the +U axis to the +V axis and the normal rotation control is used for movement from the +V axis to the −V axis.

The control device 30 rotates the shaft 20 by a rotation amount obtained by adding an excess amount (40 deg) to +720 deg (excess rotation). The +y axis passes the +V axis once by the excess rotation and stops in the partway of the track R3. When the +y axis stops in the partway of the track R3, the rotation direction around the +y axis is counterclockwise.

The control device 30 then reversely rotates the shaft 20 by 40 deg and moves the +y axis to the +V axis. When the shaft 20 is rotated clockwise as viewed in the −X direction, the rotation direction around the +y axis is reversed from the rotation direction shown in FIG. 18. Therefore, the rotation direction around the +y axis immediately before the +y axis reaches the +V axis is clockwise.

In this case, the angular velocity sensor 26 outputs a positive moving angular velocity before time t21. The +y axis stops at the +V axis at time t21 and thereafter the angular velocity output continues to decrease. As a result, the error $\delta 1$ associated with the time constant included in the rotational angular velocity of the +V axis decreases over time.

The +y axis moves from the +V axis to the −V axis by the normal rotation control. Change in the angular velocity output over time until the +y axis reaches the −V axis (until time t25) and change in the angular velocity output over time when the +y axis stops at the +V axis (at time t25 and thereafter) are the same as change over time from time t14 and thereafter shown in FIG. 21. More specifically, the error $\delta_2$ associated with the time constant included in the rotational angular velocity of the −V axis decreases over time.

The error $\delta_1$ associated with the time constant included in the rotational angular velocity of the +V axis has the same characteristic as that of the error $\delta_2$ associated with the time constant included in the rotational angular velocity of the −V axis by the excess rotation control. Therefore, when Expression (2) is subtracted from Expression (1) in order to obtain a rotational angular velocity $\omega_V$ (rotational angular velocity in the axial direction along the +V and −V directions), the error $\delta_1$ associated with the time constant is canceled by the error $\delta_2$ associated with the time constant. Therefore, the effect of the error associated with the time constant can be reduced in the rotational angular velocity $\omega_V$, so that the detection accuracy for true north can be improved.

Now, a criterion for determining which movement of the +y axis is subjected to the excess rotation control will be described.

Figures 23, 24:
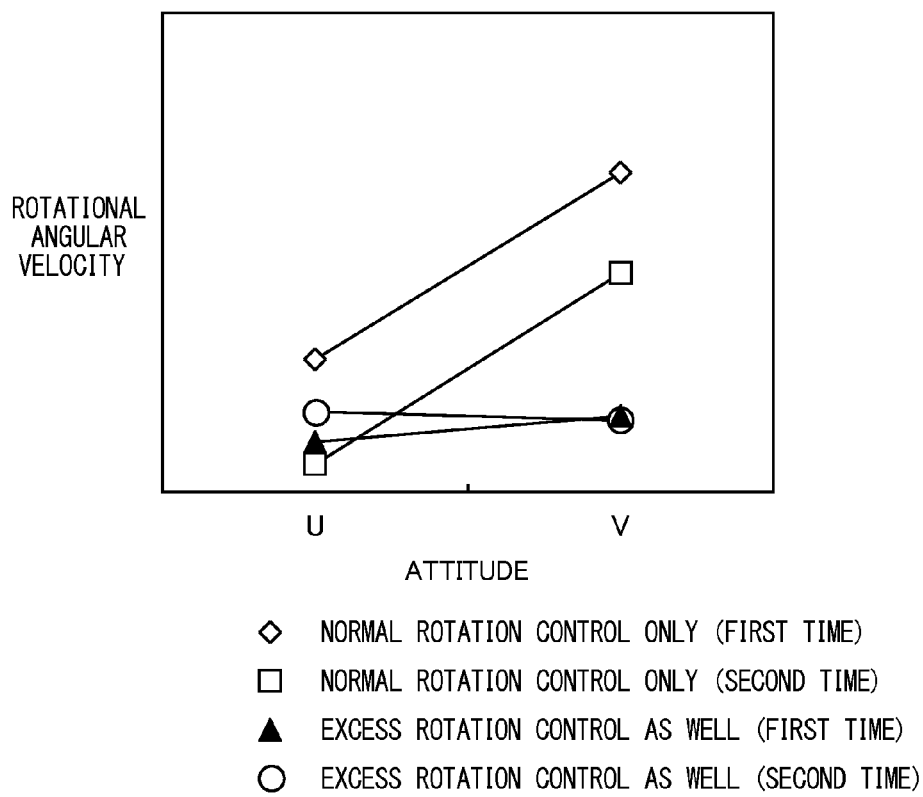
FIG. 23 is a table showing a relation between the rotation direction of the shaft in FIG. 3 and the signs of the U, V, and W axes in FIG. 11.
FIG. 24 is a graph showing a result of measurement for rotational angular velocities around the U axis and the V axis in FIG. 11.

FIG. 23 is a table showing a relation between the rotation direction of the shaft 20 and the signs of the U, V, and W axes. Referring to FIG. 23, A indicates the signs of the U, V, and W axes. The sign of the +U, +V, and +W axes is positive. The sign of the −U, −V or −W axes is negative.

B indicates the rotation direction of the shaft 20 when the shaft 20 is rotated based on the rotation position control table 33. When the shaft 20 is rotated clockwise as viewed in the −X direction, B is set to the minus sign and when the shaft 20 is rotated counterclockwise as viewed in the −X direction, B is set to the plus sign.

A×B is a product of the sign (A) of the U, V, and W axes and the sign (B) of the rotation direction of the shaft 20. Hereinafter, A×B will be referred to as the "sign product" for the ease of description. The sign product corresponds to the rotation direction around the +y axis immediately before the +y axis stops at each axis. When the sign product is positive, the rotation direction around the y axis immediately before stopping at each axis is counterclockwise. When the sign product is negative, the rotation direction around the y-axis immediately before stopping at each axis is clockwise.

When for example the +y axis moves from the +V axis to the −V axis, the rotation direction of the +y axis immediately before the +y axis stops at the −V axis is clockwise and matches the rotation direction around the +y axis shown in FIG. 18.

Whether movement of the +y axis is subjected to the normal rotation control or the excess rotation control is determined based on the sign product. More specifically, in the excess rotation control, the shaft 20 is rotated to excess by more than a rotation amount set in the rotation position control table 33 and then reversely rotated and therefore the time required for the excess rotation control is longer than the time required for the normal rotation control. Therefore, when the control device 30 measures a rotational angular velocity of a certain axis, a target for the excess rotation control may be determined so that the normal rotation control is carried out a larger number of times than the excess rotation control.

For example, as for the V axis, the sign product A×B is more often negative than positive. Therefore, the control device 30 carries out the normal rotation control during movement from the +V axis to the −V axis and from the −V axis to the +V axis and the excess rotation control during movement from the +U axis to the +V axis. The number of times to carry out the excess rotation control is reduced, and therefore the time required for measuring the rotational angular velocity of each axis can be reduced.

As for the U axis, the sign product A×B is always negative and as for the W axis, the sign product A×B is always positive. Therefore, when the rotational angular velocities $\omega_U$ and $\omega_W$ are measured, the control device 30 needs only carry out the normal rotation control.

Alternatively, the target for the excess rotation control may be determined so that the sign product is the same for all the axes. In the sign products A×B shown in FIG. 23, the positive numbers are less than the negative numbers. Therefore, the excess rotation control may be carried out during movement from +U axis to the −U axis, from −U axis to the +U axis, from the +V axis to the −V axis, and from the −V axis to the +V axis where the sign product A×B is set to negative.

In this way, the control device 30 controls the attitude changer 100 so that the angular velocity sensor 26 rotates in a first rotation direction around the detection axis (+y axis) by the normal rotation control before the angular velocity sensor 26 starts to measure an angular velocity around a predetermined measuring direction. The control device 30 controls the attitude changer 100 so that the angular velocity sensor 26 rotates in a second rotation direction opposite to the first rotation direction around the detection axis (+y axis) and, thereafter, the angular velocity sensor 26 rotates in the first rotation direction around the detection axis (+y axis) by the excess rotation control before the angular velocity sensor 26 starts to measure an angular velocity around an opposite direction to the predetermined measuring direction. In this way, the error caused by the effect of the time constant included in the output from the angular velocity sensor can be reduced.

FIG. 24 is a graph showing measurement results of rotational angular velocities using only the normal rotation control and using the excess rotation control in addition to the normal rotation control. The graph in FIG. 24 shows the measurement results of the rotational angular velocities of the axes in the order specified in the rotation position control table 33 shown in FIG. 20.

The rotational angular velocities obtained by additionally carrying out the excess rotation control as well are generally smaller than the rotational angular velocities obtained by carrying out only the normal rotation control. This is because the error associated with the time constant is not canceled only by the normal rotation control and added to the rotational angular velocities while the error is canceled by additionally carrying out the excess rotation control. As can be understood, the use of the excess rotation control can improve the measuring accuracy for the rotational angular velocity.

Furthermore, variations in the rotational angular velocity are reduced by additionally carrying out the excess rotation control as compared to the case of carrying out only the normal rotation control. The variations in the rotational angular velocity are generated by the error associated with the time constant. As can be understood, the error associated with the time constant is canceled by the excess rotation control, so that the variations in the rotational angular velocity are reduced.

Rotation Control of Shaft 20

Figure 25:
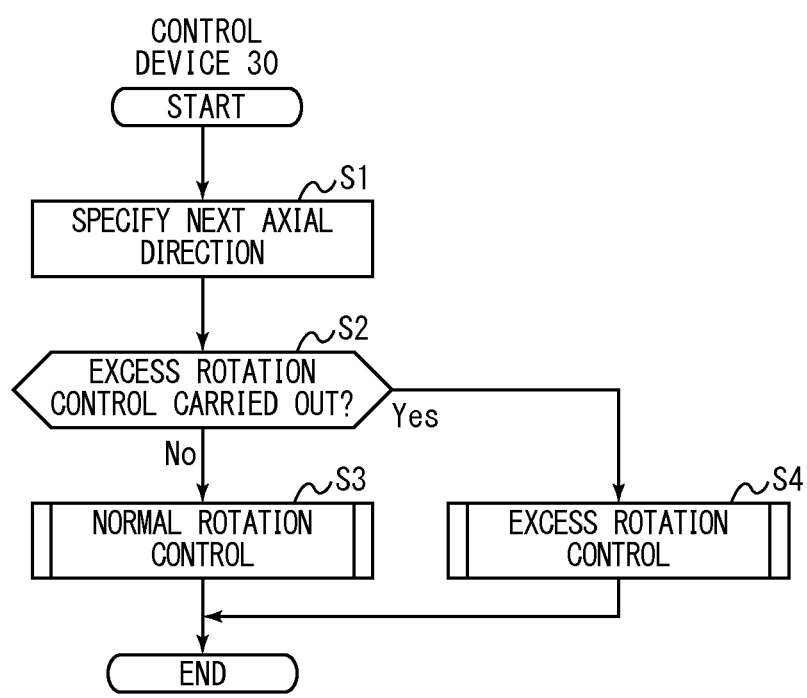
FIG. 25 is a flowchart for the control device in FIG. 19.

FIG. 25 is a flowchart for illustrating the control device 30. Referring to FIG. 25, the control device 30 specifies the next direction in which the +y axis is directed based on the present position of the +y axis and the rotation position control table 33 (step S1).

The control device 30 determines whether or not to carry out the excess rotation control when the +y axis is moved to the next axial direction (step S2). More specifically, the control device 30 refers to the rotation position control table 33. The control device 30 carries out the normal rotation control if the control flag for the next axial direction is set to 0 (No in step S2) (step S3). For example, referring to FIG. 20, the control device 30 carries out the normal rotation control if the next axial direction is along the −U axis, since the control flag for the −U axis is set to 0.

On the other hand, if the control flag for the next axial direction is set to 1 (Yes in step S2), the control device 30 carries out the excess rotation control (step S4). For example, referring to FIG. 20, if the present position of the +y axis is at the +U axis and the next stopping position is at the +V axis, the control device 30 carries out the excess rotation control since the control flag for the +V axis is set to 1.

Figure 26:
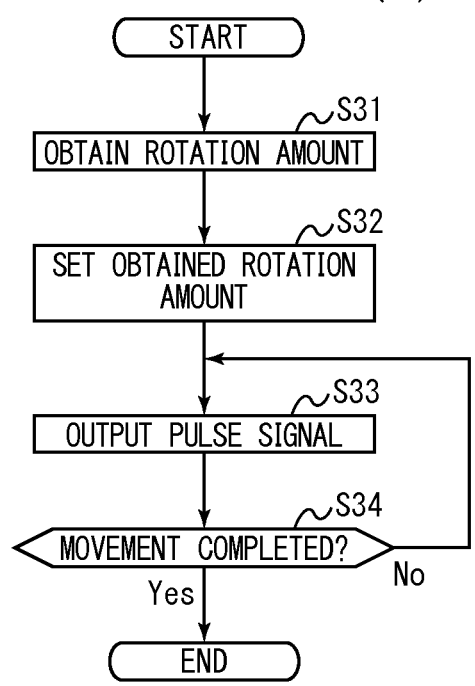
FIG. 26 is a flowchart for illustrating normal rotation control processing in FIG. 25.

FIG. 26 is a flowchart for illustrating the normal rotation control (step S3). Referring to FIG. 26, the control device 30 obtains a rotation amount corresponding to the next axial direction from the rotation position control table 33 (step S31) and sets the obtained rotation amount as a rotation amount for the shaft 20 (step S32). The control device 30 outputs a pulse signal corresponding to the obtained rotation amount to the driving source 3 (step S33). The rotation amount of the shaft 20 reaches the set rotation amount (Yes in step S34), the control device 30 ends the normal rotation control.

Figure 27:
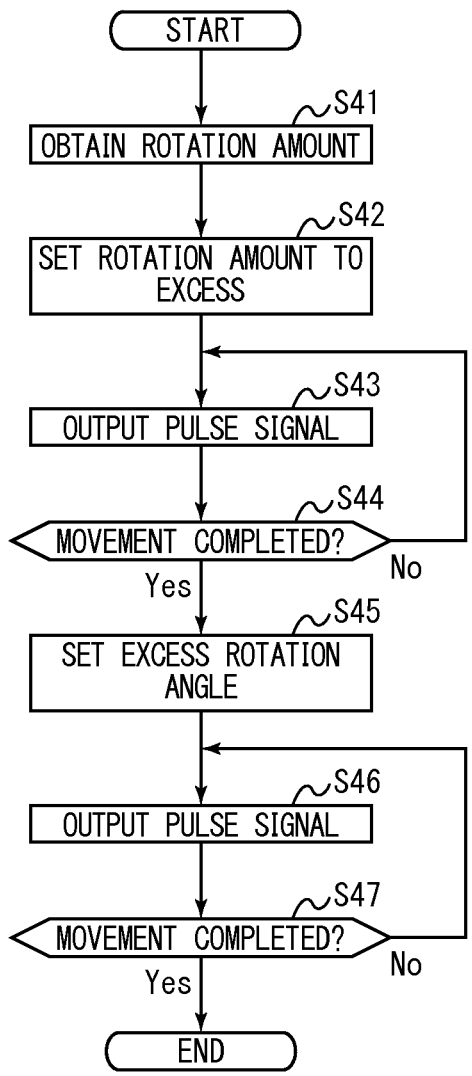
FIG. 27 is a flowchart for illustrating excess rotation control processing in FIG. 25.

FIG. 27 is a flowchart for illustrating the excess rotation control (step S4). Referring to FIG. 27, the control device 30 obtains a rotation amount corresponding to the next stopping position from the rotation position control table 33 (step S41). The driving source controller 32 adds a preset excess amount (40 deg) to the obtained rotation amount to set the rotation amount of the shaft 20 to excess (step S42). If the sign of the obtained rotation amount is positive, the rotation amount of the shaft 20 is set by adding the excess rotation amount to the obtained rotation amount. If the sign of the obtained rotation amount is negative, the rotation amount of the shaft 20 is set to excess by subtracting the excess rotation amount from the obtained rotation amount.

The control device 30 outputs a pulse signal according to the set rotation amount to the driving source 3 (step S43). In this way, the +y axis passes the next axial direction once.

If the rotational movement amount of the shaft 20 reaches the rotation amount set to excess (Yes in step S44), the control device 30 sets the excess amount as the rotation amount for the shaft 20 (step S45). The rotation direction is set in an opposite direction based on the sign of the rotation amount obtained in step S41. The control device 30 outputs a pulse signal according to the set rotation amount to the driving source 3 (step S46). The pulse signal continues to be output to the driving source 3 until the rotation amount of the shaft 20 reaches the set rotation amount (Yes in step S46). In this way, the +y axis stops in the specified next axial direction.

As in the foregoing, the direction detector 1 carries out the normal rotation control or the excess rotation control. In this way, the rotation directions around the y-axis immediately before the +y axis reaches the positive and negative directions of each of the U, V, and W axes can be matched. Since the error associated with the time constant can be canceled when the rotational angular velocities of the U, V, and W axes are calculated, the detection accuracy for the azimuth angle ψ can be improved.

According to the above-described embodiment, the single-axis type direction detector 1 carries out the normal rotation control and the excess rotation control but the invention is not limited to this arrangement. A two-axis or three-axis type direction detector may carry out the normal rotation control and the excess rotation control.

For example, a three-axis type direction detector including angular velocity sensors for X, Y, and Z axes may be considered. The three-axis type direction detector measures rotational angular velocities of +X and −X axes by rotating the angular velocity sensor for X axis around the Y axis. At the time, the angular velocity sensor for the Y axis rotates around the Y axis. Therefore, depending on the order of measuring for the +X axis, −X axis, +Y axis, and −Y axis, the rotation direction of the angular velocity sensor for the Y axis may be reversed between immediately before measuring the rotational angular velocity of the +Y axis and immediately before measuring the rotational angular velocity of the −Y axis.

In this case, the three-axis type direction detector may carry out the excess rotation control before starting to measure the rotational angular velocity of the +Y axis. In this way, the rotation direction of the rotational angular velocity sensor for the Y axis immediately before measuring the rotational angular velocity of the +Y axis may be the same as that immediately before measuring the rotational angular velocity of the −Y axis, so that the measuring accuracy for the rotational angular velocities in the Y-axis direction can be improved.

According to the above-described embodiment, the functional blocks of the control device 30 may be implemented separately as one-chip devices by semiconductor devices such as LSIs or as a one-chip device including part or all of the blocks. The method of forming an integrated circuit is not limited to that of LSIs and such a circuit may be implemented by a dedicated circuit or a general-purpose processor. An FPGA (Field Programmable Gate Array) that can be programmed after an LSI is produced or a reconfigurable processor that includes reconfigurable circuit cell connection or setting in an LSI may be employed.

Processing by the above-described functional blocks may be partly or entirely implemented by programs. The processing by the functional blocks according to the embodiment is partly or entirely carried out by a central processing unit (CPU) in a computer. The programs used to carry out the various kinds of processing are stored in a storage device such as a hard disk and a ROM, read out from a ROM or to a RAM and run. These programs may be provided as they are stored on a storage medium such as a CD and a DVD.

The various kinds of processing according to the embodiment may be implemented by hardware or software (including implementation with an OS (Operating System), middleware, or a predetermined library). Moreover, they may be implemented by mixed processing using software and hardware. It should be understood that if the control device 30 according to the embodiment is implemented by hardware, timings must be adjusted for carrying out the various kinds of processing. In the above-description of the embodiment, details of timing adjustment for various signals carried out in actual hardware designing are not included for the ease of description.

The embodiment of the present invention has been described but the same is only exemplary illustration of how the present invention is carried out. Therefore, the invention is not limited by the description of the embodiment and modifications may be made to the above-described embodiment without departing the scope of the invention.

What is claimed is:

1. A direction detector, comprising:
an angular velocity sensor;
an attitude changer that rotates the angular velocity sensor around a detection axis and changes an attitude of the angular velocity sensor so that the detection axis is directed in a predetermined measuring direction and an opposite direction to the predetermined measuring direction; and
a control device that controls the attitude changer,
the control device comprising:
a first controller that controls the attitude changer so that the angular velocity sensor rotates in a first rotation direction around the detection axis before the angular velocity sensor starts to detect an angular velocity around the predetermined measuring direction, and
a second controller that controls the attitude changer so that the angular velocity sensor rotates in a second rotation direction opposite to the first rotation direction around the detection axis and, thereafter, the angular velocity sensor rotates in the first rotation direction around the detection axis before the angular velocity sensor starts to detect an angular velocity around the opposite direction.

2. The direction detector according to claim 1, wherein the control device obtains a rotational angular velocity around an axis along the predetermined measuring direction by calculating a difference between an angular velocity around the predetermined measuring direction detected by the angular velocity sensor and an angular velocity around the opposite direction detected by the angular velocity sensor.

3. The direction detector according to claim 1, wherein the attitude changer is provided in an XYZ rectangular coordinate system,
the attitude changer comprises:
a shaft extending in an X-axis direction,
a rotation member provided rotatably around an axis inclined at a deg with respect to the shaft, coupled to the shaft, and having an xyz rectangular moving coordinate system, the rotation member including a spherical surface and an orbit portion formed around an x-axis of the spherical surface,
a driving source controlled by the control device to rotate the shaft around the X axis, and
a guide member fixed to the XYZ rectangular coordinate system and in contact with the orbit portion,
the orbit portion has such a shape that an y axis of the rotation member is sequentially directed in positive and negative directions along a U axis, a V axis, and a W axis crossing one another at intervals of 60 deg around the X axis when the orbit portion rotates in contact with the guide member by the rotation of the shaft, the orbit portion having a zigzag shape including four mountain-like portions raised in a positive direction of the x axis and four valley-like portions raised in a negative direction, the angular velocity sensor is attached to the rotation member so that the detection axis is directed along the y axis, and the opposite direction to the predetermined measuring direction matches one of the U axis, the V axis, and the W axis.

4. The direction detector according to claim 3, wherein when the angular velocity sensor detects an angular velocity around an axial direction of one of the U axis, the V axis, and the W axis, the control device controls the attitude changer so that the detection axis is directed in the positive direction, the negative direction, and the positive direction of the one axis in the mentioned order, and when the angular velocity sensor detects an angular velocity around the one axial direction, control by the second controller is carried out a smaller number of times than control by the first controller.

5. The direction detector according to claim 3, wherein when the detection axis is directed in the positive direction of one of the U axis, the V axis, and the W axis, the detection axis has a plus sign, while when the detection axis is directed in the negative direction of one of the U axis, the V axis, and the W axis, the detection axis has a minus sign, when the shaft rotates clockwise as viewed from a front of the direction detector, the rotation direction of the shaft has a plus sign, while when the shaft rotates counterclockwise, the rotation direction of the shaft has a minus sign, and when the detection axis is directed in the positive direction and the negative direction of the one axis, whether or not to control the attitude changer by the first controller is determined based on a product of the sign of the detection axis and the sign of the rotation direction.

6. A control program product for a computer provided in a direction detector comprising an angular velocity sensor that detects an angular velocity around a detection axis and an attitude changer that rotates the angular velocity sensor around the detection axis and changes an attitude of the angular velocity sensor so that the detection axis is directed in a predetermined measuring direction and an opposite direction to the predetermined measuring direction, the control program product allowing the computer to perform the steps of:

controlling the attitude changer so that the angular velocity sensor rotates in a first rotation direction around the detection axis before the angular velocity sensor starts to detect an angular velocity around the predetermined measuring direction; and controlling the attitude changer so that the angular velocity sensor is rotated in a second rotation direction opposite to the first rotation direction around the detection axis and, thereafter, the angular velocity sensor is rotated in the first rotation direction around the detection axis before the angular velocity sensor starts to detect an angular velocity around the opposite direction.

* * * * *